(12) United States Patent
Priley

(10) Patent No.: US 9,521,923 B2
(45) Date of Patent: Dec. 20, 2016

(54) BREWABLE BEVERAGE MAKING CUP ADAPTOR FOR CARTRIDGE TYPE COFFEE MAKING MACHINES AND CARTRIDGE TYPE COFFEE MAKING MACHINE

(71) Applicants: Pangaea Labs Ltd., Fo Tan, N.T. (HK); Affinitea Brewing Technologies, Inc., Sacramento, CA (US)

(72) Inventor: Anthony P. Priley, Sacramento, CA (US)

(73) Assignees: Pangaea Labs Ltd., Fo Tan, N.T., (HK); Affinitea Brewing Technologies, Inc., Sacramento, CA (US)

( * ) Notice: Subject to any disclaimer, the term of this patent is extended or adjusted under 35 U.S.C. 154(b) by 339 days.

(21) Appl. No.: 14/140,189

(22) Filed: Dec. 24, 2013

(65) Prior Publication Data

US 2015/0173562 A1   Jun. 25, 2015

(51) Int. Cl.
  *A47J 31/057* (2006.01)
  *A47J 31/40* (2006.01)
(52) U.S. Cl.
  CPC ................... *A47J 31/407* (2013.01)
(58) Field of Classification Search
  CPC ......... A47J 31/00; A47J 31/46; A47J 31/0689
  USPC ........................................ 99/300, 299, 283
  See application file for complete search history.

(56) References Cited

U.S. PATENT DOCUMENTS

| | | |
|---|---|---|
| 4,998,462 A | 3/1991 | Sekiguchi |
| 5,632,193 A | 5/1997 | Shen |
| 6,220,147 B1 | 4/2001 | Priley |
| 6,488,976 B1 | 12/2002 | Priley |
| 6,722,265 B2 | 4/2004 | Priley |
| 6,810,789 B2 | 11/2004 | Chung et al. |
| 6,973,869 B1 | 12/2005 | Lin |
| 7,717,026 B1 | 5/2010 | Lassota |
| 7,930,972 B2 | 4/2011 | Denisart et al. |
| 8,667,892 B2 * | 3/2014 | Cominelli ............... A47J 31/46 99/295 |
| 8,997,633 B2 | 4/2015 | Bishop et al. |
| 9,295,358 B2 | 3/2016 | Vastardis et al. |

(Continued)

FOREIGN PATENT DOCUMENTS

| | | |
|---|---|---|
| CN | 2922489 Y | 7/2007 |
| CN | 201048847 Y | 4/2008 |

(Continued)

*Primary Examiner* — Dana Ross
*Assistant Examiner* — Ayub Maye
(74) *Attorney, Agent, or Firm* — Richard M. Goldberg

(57) ABSTRACT

A brewable beverage making cup adaptor for cartridge type coffee making machines of the type having an inlet spout for supplying pressurized hot water, includes a cup body defining a chamber for holding a brewable material; a lower closure closing a lower end of the cup body, and including a small discharge opening through which a brewed liquid is discharged; an upper cover closing an upper end of the cup body, and including an inlet opening adapted to be positioned below the inlet spout for the supply of pressurized water to the cup body, and an offset valve opening for fluidly connecting the chamber with ambient atmosphere; and a valve for closing the valve opening when the chamber is filled at least at a predetermined level with the pressurized water and for opening the valve opening when the pressurized water in the chamber falls below the predetermined level.

21 Claims, 47 Drawing Sheets

(56) References Cited

U.S. PATENT DOCUMENTS

| | | |
|---|---|---|
| 2006/0280841 A1 | 12/2006 | Cai |
| 2009/0029021 A1 | 1/2009 | Nielsen et al. |
| 2010/0139496 A1* | 6/2010 | Santoiemmo ........ B67D 1/0888 99/323.2 |
| 2011/0200726 A1 | 8/2011 | Tinkler et al. |
| 2011/0226343 A1* | 9/2011 | Novak ..................... A23L 2/54 137/12.5 |
| 2011/0256273 A1 | 10/2011 | de Graaff et al. |
| 2012/0058226 A1 | 3/2012 | Winkler et al. |
| 2013/0055904 A1 | 3/2013 | DeMiglio et al. |
| 2013/0199379 A1 | 8/2013 | Arnett |

FOREIGN PATENT DOCUMENTS

| | | | |
|---|---|---|---|
| CN | 102026891 A | 4/2011 | |
| WO | WO 2011138405 A1 * | 11/2011 | .......... A47J 31/0668 |
| WO | 2012/084964 A1 | 6/2012 | |

\* cited by examiner

BREWABLE BEVERAGE MAKING CUP ADAPTOR FOR CARTRIDGE TYPE COFFEE MAKING MACHINES AND CARTRIDGE TYPE COFFEE MAKING MACHINE

BACKGROUND OF THE INVENTION

The present invention relates generally to cartridge type coffee making machines, and more particularly, is directed to a brewable beverage making cup adaptor for such cartridge type coffee making machines, which can use tea, coffee, cocoa, hops, malts and grains for such brewing.

A single serve coffee brewing machine sold under the registered trademark KEURIG has become very popular. This machine uses a single portion cartridge or packet sold under the registered trademark K-CUP. Each packet includes a cup packed with a brewing material, such as coffee, and sealed air tight at its upper open end with a foil lid. A similar machine is sold under the trademark NESPRESSO.

When the packet is placed in one of its brewing machines, the brewer punctures the foil lid with a spray nozzle and the bottom wall of the packet with a discharge nozzle. Coffee grounds are held in the packet. Hot water under pressure is supplied through the spray nozzle, mixes with the coffee grounds, and then exits through the discharge nozzle to a coffee mug positioned by the user below the discharge nozzle.

With this arrangement, however, the output punched hole is basically the same size as the input punched hole, so that there is no steeping or residence time of the hot water in the packet, that is, the water quickly flows through the coffee and out the punched outlet hole. Further, as the water enters the packet, air in the packet rises as a bubble of air. However, because the only inlet opening is the punched hole in the foil lid through which the water is supplied, there is nowhere for the air to escape. As a result, the pocket of air further prevents the water from rising in the packet to properly mix with all of the coffee grounds, as well as providing added pressure for pushing the water quickly out of the punched outlet hole.

In addition to being used with coffee, the packets sold under the trademark K-CUP also include tea leaves for brewing tea, cocoa for making hot cocoa beverages, as well as fruit brews for making fruit drinks:

The KEURIG system also includes a refillable cartridge or basket with a filter that can be inserted therein and filled with a brewable material sold under the trademark MY K-CUP. A top is provided with an opening that is always open and receives the input nozzle of the machine, as well as having side air vents for fluidly connecting the interior with atmospheric pressure. The bottom of the basket includes at least one outlet discharge opening, which has a greater area than the inlet water opening in the top. Thus, there is no need for any puncturing devices. To fit this device in the Keurig machine, a sub-housing must be removed first.

However, with the refillable basket, because the outlet opening has a greater area than the inlet opening, and because of the vent openings, the hot water input into the basket will flow very rapidly out through the outlet discharge opening, with very little steeping or residence time.

With the above systems, the hot water does not always sufficiently extract the flavor from the material in the packet. This is because the water flows into and out of the cartridge very quickly, without providing sufficient time to extract the flavor from the materials in the cartridge. This is particularly the case with tea leaves, where it is necessary for the hot water to interact with the tea leaves over a larger time period.

SUMMARY OF THE INVENTION

Accordingly, it is an object of the present invention to provide a brewable beverage making cup adaptor for cartridge type coffee making machines that overcomes the aforementioned problems.

It is another object of the present invention to provide a brewable beverage making cup adaptor for cartridge type coffee making machines which serves to better force the water into the brewable material, particularly where the material consists of tea leaves, to better extract the flavor from the tea leaves.

It is still another object of the present invention to provide a brewable beverage making cup adaptor for cartridge type coffee making machines which permits air to escape the adaptor during initial filling of the hot water therein, but which pressurizes the adaptor or packet once it is filled with hot water and the air escapes therefrom.

It is yet another object of the present invention to provide a brewable beverage making cup adaptor for cartridge type coffee making machines which prevents air or vapor lock at the upper end of the adaptor or packet during filling of the hot water therein.

It is a further object of the present invention to provide a brewable beverage making cup adaptor for cartridge type coffee making machines which provides agitation and turbulence of the hot water entering the adaptor or packet, providing an improved mixing of the water with the material therein, to better extract the flavor from the material.

It is a still further object of the present invention to provide a brewable beverage making cup adaptor for cartridge type coffee making machines that is easy and economical to make and use.

In accordance with an aspect of the present invention, a brewable beverage making cup adaptor for cartridge type coffee making machines of the type having an inlet spout for supplying pressurized hot water, includes a cup body defining a chamber for holding a brewable material, the cup body having a discharge opening at a lower end thereof through which a brewed liquid is discharged, an inlet opening adapted to be positioned relative to the inlet spout for the supply of pressurized water to the cup body, and a third opening for providing for removal of air from an upper portion of the chamber as the pressurized hot water fills the chamber; and an arrangement fluidly connected with the chamber for preventing liquid in the chamber from exiting through the third opening.

The arrangement also provides for increased pressurization of the chamber when the pressurized hot water fills the chamber and the air is removed from the upper portion of the chamber. The arrangement also permits air to enter the chamber when a level of the pressurized hot water in the chamber falls at the end of a brewing operation.

In one embodiment, the arrangement includes a closed air chamber in fluid communication with the third opening of the chamber in the cup body into which the air is removed from the upper portion of the chamber as the pressurized hot water fills the chamber, and which becomes compressed in the closed air chamber. Preferably, the closed air chamber is defined by an annular closed wall in surrounding relation to the cup body.

In another embodiment, the adaptor includes an upper cover for closing an upper end of the cup body, the upper cover including the third opening for fluidly connecting the chamber with ambient atmosphere, and the arrangement includes a valve associated with the third opening for closing the third opening when the chamber is filled at least at a predetermined level with the pressurized water and for opening the third opening when the pressurized water in the chamber falls below the predetermined level. Preferably, the wherein the valve is connected to the upper cover.

The valve includes a valve housing, and further includes a screen at least partially covering the valve housing to prevent tea leaves and coffee grounds from entering the valve housing, while still allowing water to escape the valve housing when a brewing cycle is completed. Preferably, the valve is a float valve including a valve housing positioned at the third opening, a valve ball movably positioned within the valve housing and a retaining assembly for retaining the valve ball in the valve housing while permitting liquid to travel into and out of the valve housing, wherein the valve ball rises with the pressurized water when the pressurized water reaches the predetermined level to close the third opening, and falls when the pressurized water falls below the predetermined level to open the third opening.

The adaptor includes an elongated water entrance tube connected with the upper cover and extending down therefrom into the chamber, the water entrance tube having an inlet opening fluidly connected with the inlet opening of the upper cover and extending into the chamber, and at least one outlet opening in the water entrance tube. Preferably, the at least one outlet opening includes two diametrically opposite outlet openings, and more preferably, each outlet opening is angled upwardly.

The discharge opening has a smaller diameter than the inlet opening.

There is also a filter member at a lower end of the cup body and above the discharge opening to prevent escape of the brewable material through the discharge opening.

The lower end of the cup body includes a tapered wall structure for guiding a brewed liquid from the cup body to the discharge opening.

In addition, an atomizing device is positioned below the discharge opening for atomizing a brewed liquid from the cup body discharged through the discharge opening in order to cool the brewed liquid.

In accordance with another aspect of the present invention, a brewable beverage making cup adaptor for cartridge type coffee making machines of the type having an inlet spout for supplying pressurized hot water, includes a cup body defining a chamber for holding a brewable material, the cup body having a discharge opening at a lower end thereof through which a brewed liquid is discharged, and an inlet opening adapted to be positioned relative to the inlet spout for the supply of pressurized water to the cup body, and an atomizing device positioned below the discharge opening for atomizing a brewed liquid from the cup body discharged through the discharge opening in order to cool the brewed liquid.

In accordance with still another aspect of the present invention, a cartridge type coffee making machine for use with a single serve cartridge containing a brewable material, the machine includes a source of pressurized hot water and a movable support. An inlet spout is connected with the movable support and the source of pressurized hot water for supplying pressurized hot water through an inlet supply opening in the single serve cartridge to a chamber in the single serve cartridge that contains a brewable material. A valve assembly is connected with the movable support for closing a valve opening in the single serve cartridge when the chamber is filled at least at a predetermined level with the pressurized water and for opening the valve opening when the pressurized water in the chamber falls below the predetermined level. There is also an arrangement for moving the movable support between a first operative position where the inlet spout is adapted to supply the pressurized hot water to the chamber through the inlet supply opening and the valve assembly is moved into the chamber through the valve opening, and a second inoperative position where the inlet spout is moved away from the inlet supply opening and the valve assembly is moved out of the chamber. A discharge opening is provided for discharging a brewed liquid from the chamber.

In a first embodiment of the cartridge type coffee making machine, the single serve cartridge includes a top having the inlet supply opening and the valve opening.

In a second embodiment of the cartridge type coffee making machine, the single serve cartridge includes a piercable top, the inlet spout includes a first piercing end that pierces the piercable top to create the inlet supply opening when the movable support is moved to the first operative position, and the valve assembly includes a second piercing end that pierces the piercable top to create the valve opening when the movable support is moved to the first operative position.

In the second embodiment of the cartridge type coffee making machine, one modification is that there is also at least one discharge piercing tube that pierces a bottom of the cartridge when the cartridge is positioned in the machine to create an outlet opening in the cartridge, to permit the brewed liquid to exit through the discharge opening.

In the second embodiment of the cartridge type coffee making machine, another modification is that a container is provided for holding one cartridge, the container including at least one discharge piercing tube that pierces a bottom of the cartridge when the cartridge is positioned in the container to create an outlet opening in the cartridge, to permit the brewed liquid to exit through the discharge opening.

The above and other features of the invention will become readily apparent from the following detailed description thereof which is to be read in connection with the accompanying drawings.

DETAILED DESCRIPTION

Figure 1:
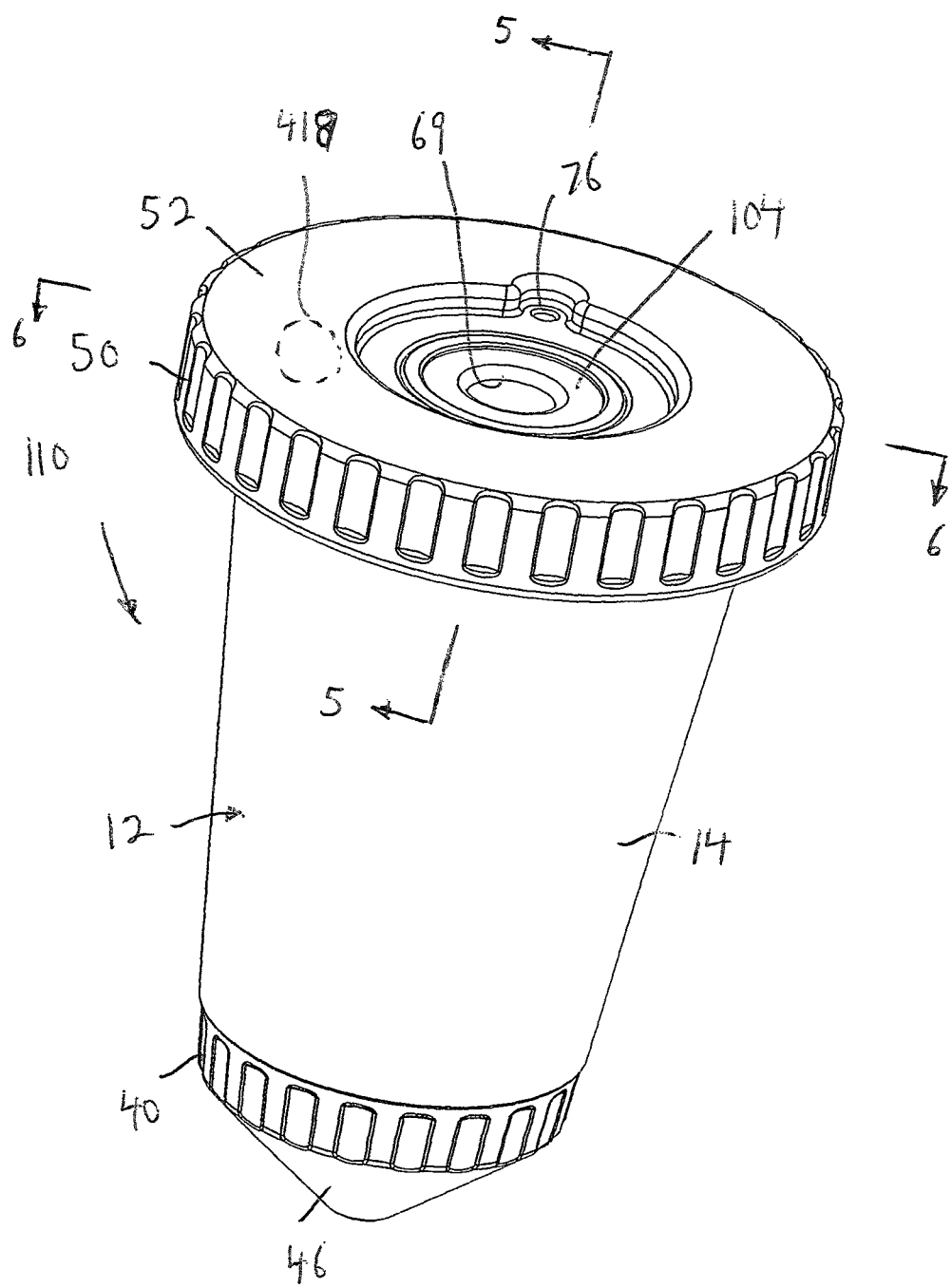
FIG. 1 is a top perspective view of the brewable beverage making cup adaptor according to the present invention.
Figure 2:
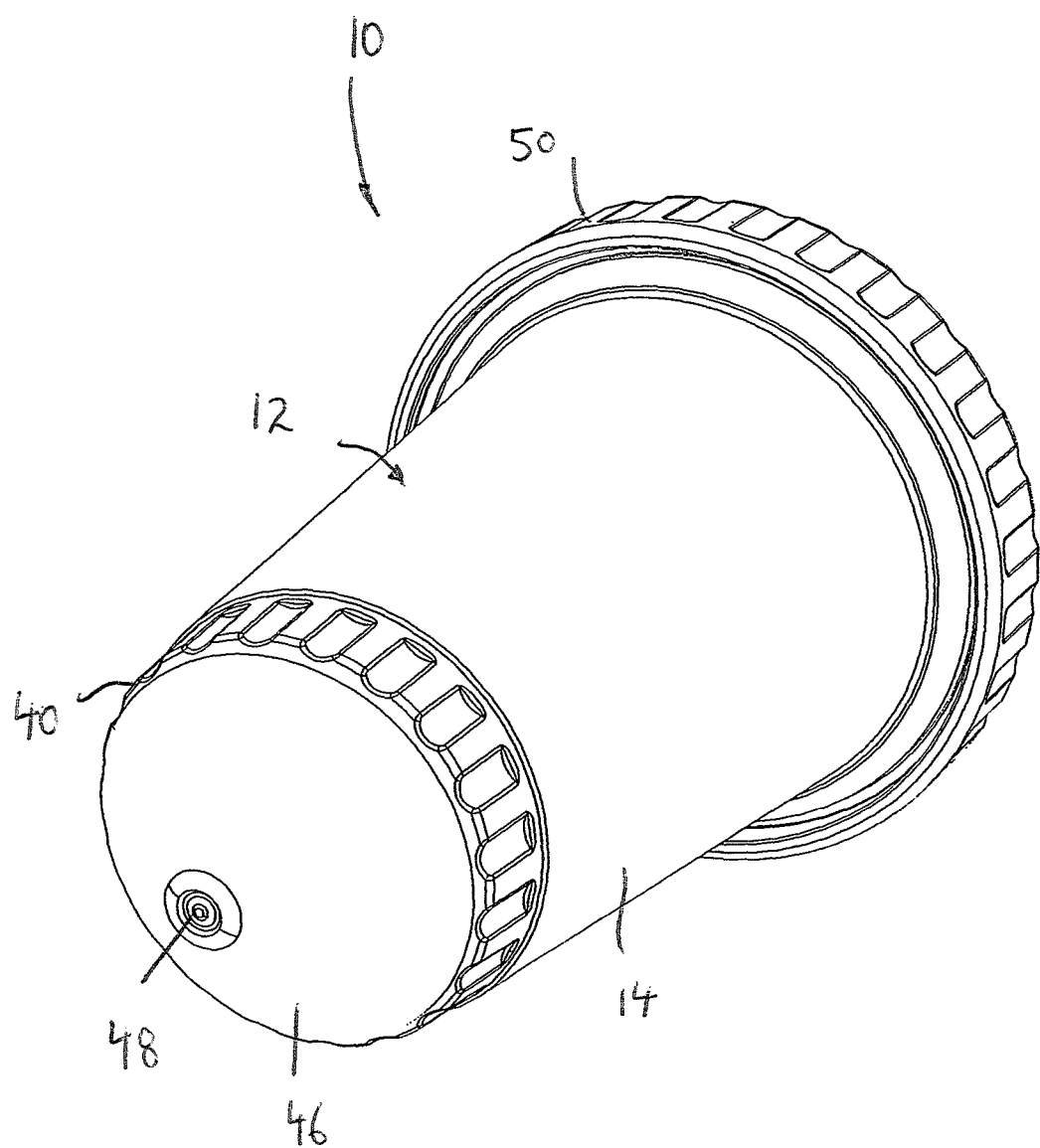
FIG. 2 is a bottom perspective view of the brewable beverage making cup adaptor.

Referring to the drawings in detail, a brewable beverage making cup adaptor 10 for cartridge type coffee making machines, particularly those sold under the trademark KEURIG or NESPRESSO, will now be described. In order to better emphasize the aspects of the present invention, brewable beverage making cup adaptor 10 will be discussed hereafter in relation to brewing of tea. However, it will be understood that the present invention is not limited thereby, and can be used with any brewable material, including but not limited to, coffee, cocoa, hops, malts and grains.

Specifically, brewable beverage making cup adaptor 10 includes a container body 12 formed from a cup body 14, a bottom cover 40 and a top cover 50. Brewable beverage making cup adaptor 10 is intended to be used with the aforementioned sub-housing of the KEURIG machine removed, as is done with the KEURIG refillable basket.

As shown best in FIGS. 1-11, cup body 14 includes a main body 15 having an inverted frusto-conical shape and defining a chamber 19 therein for holding the brewable material. Preferably, cup body 14 is made from a glass material, a metal material or a plastic material such as polypropylene. The upper end of cup body 14 includes an upper annular wall 16 of a greater diameter than the upper end of main body 15, and connected with the upper end of main body 15 by an upper annular shoulder 18. An external helical connecting thread 20 is formed on the outer surface of upper annular wall 16. In like manner, the lower end of cup body 14 includes a lower annular wall 22 of a lesser diameter than the lower end of main body 15, and connected with the lower end of main body 15 by a lower annular shoulder 24. A helical connecting thread 26 is formed on the outer surface of lower annular wall 22.

A cruciform shaped rib structure 28 is connected to the inner surface of lower annular wall 22, and a central hub 30 is formed at the center of cruciform shaped rib structure 28, and extends downwardly therefrom. Central hub is closed off by a bottom wall 32.

A circular stainless steel filter disc 34 (FIGS. 4-6) is positioned on lower annular shoulder 24, and has a central opening 36 in alignment with central hub 30. Stainless steel filter disc 34 further includes a plurality of small openings 35 therein in surrounding relation to central opening 36.

As shown in FIGS. 1-6 and 12-15, a bottom cover 40 is threadedly received on lower annular wall 22. Preferably, bottom cover 40 is made from a glass material, a metal material or a plastic material such as polypropylene. Specifically, bottom cover 40 includes an annular connecting wall 42 with an internal helical connecting thread 44 for threaded engagement with external helical connecting thread 26 in order to threadedly connect bottom cover 40 to lower annular wall 22 of cup body 14. A frusto-conical shaped wall 46 extends downwardly from the lower end of annular connecting wall 42, and has a small discharge opening 48 at the center lower end thereof, through which the brewed liquid is discharged. An annular guide wall 49 extends upwardly from the inner surface of frusto-conical shaped wall 46 slightly below the upper end thereof and spaced inwardly from lower annular wall 42 to create an annular gap 51 in which lower annular wall 22 of cup body 14 is received.

Figure 23:
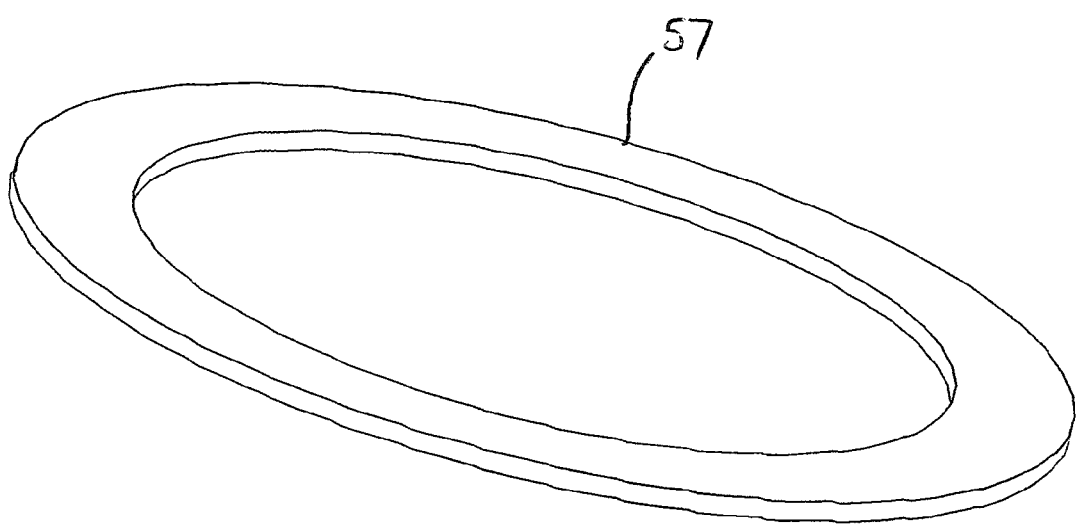
FIG. 23 is a perspective view of the annular sealing ring of the brewable beverage making cup adaptor.
Figure 24:
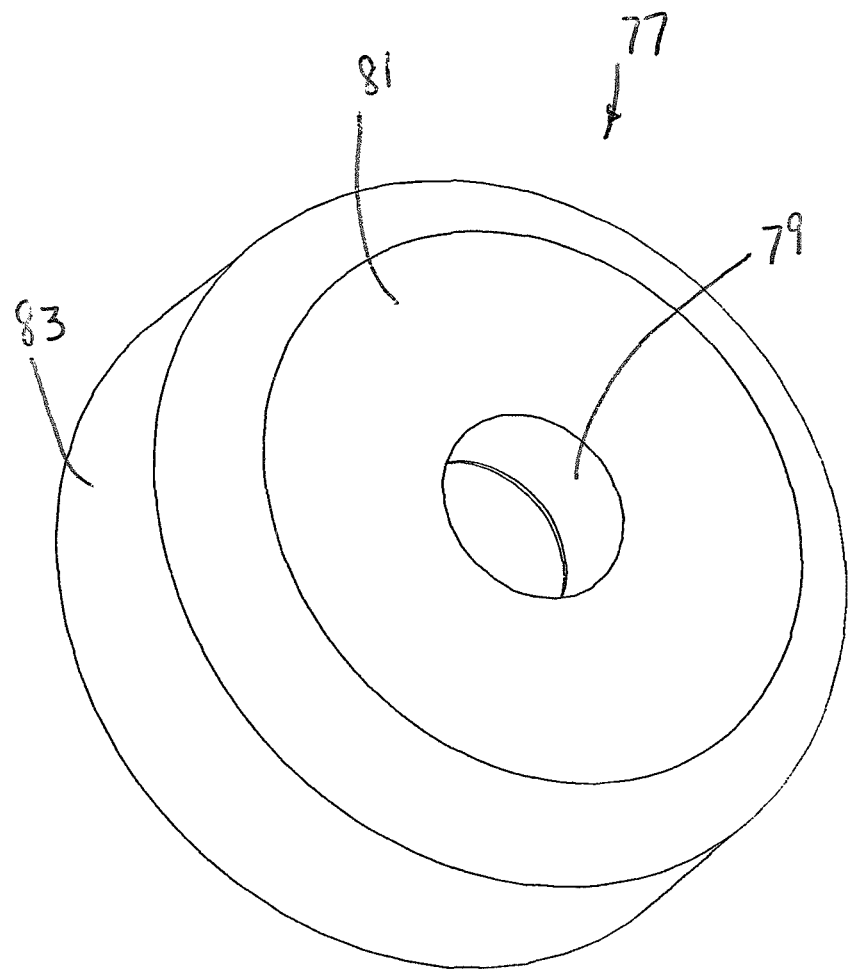
FIG. 24 is a top perspective view of the silicone ball housing of the brewable beverage making cup adaptor.
Figure 25:
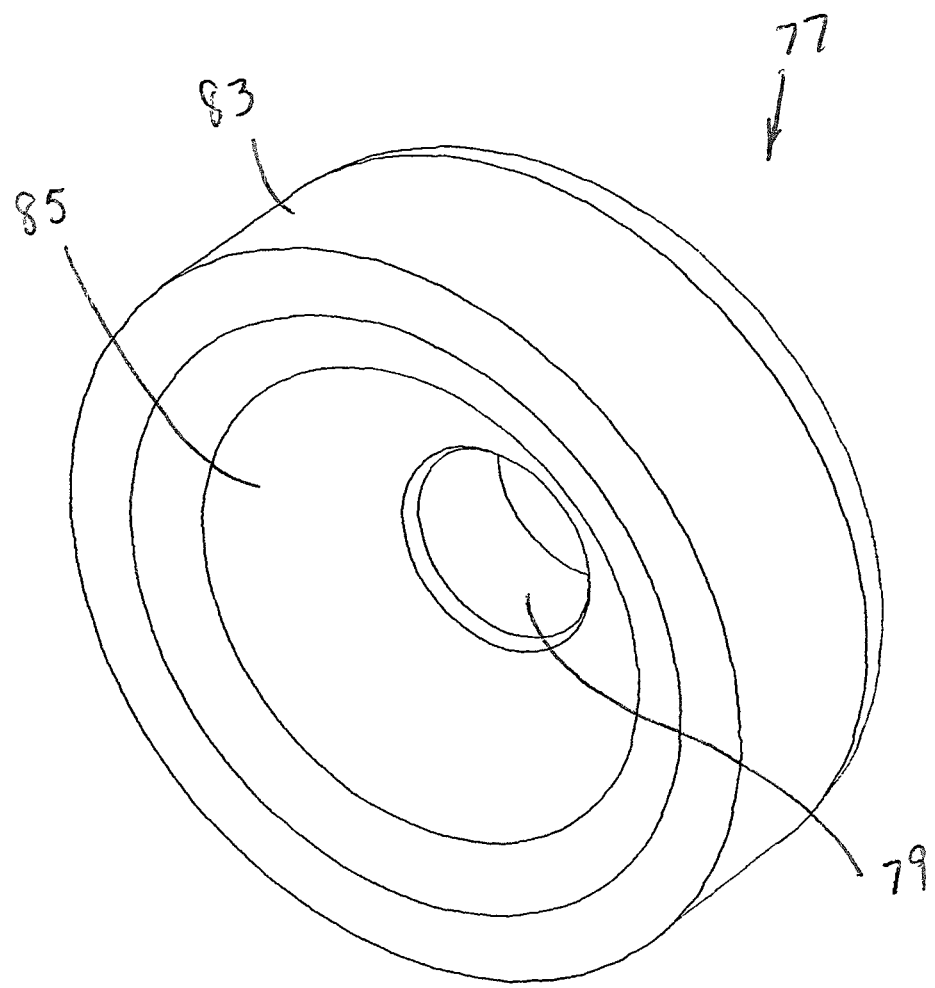
FIG. 25 is a bottom perspective view of the silicone ball housing.
Figure 26:
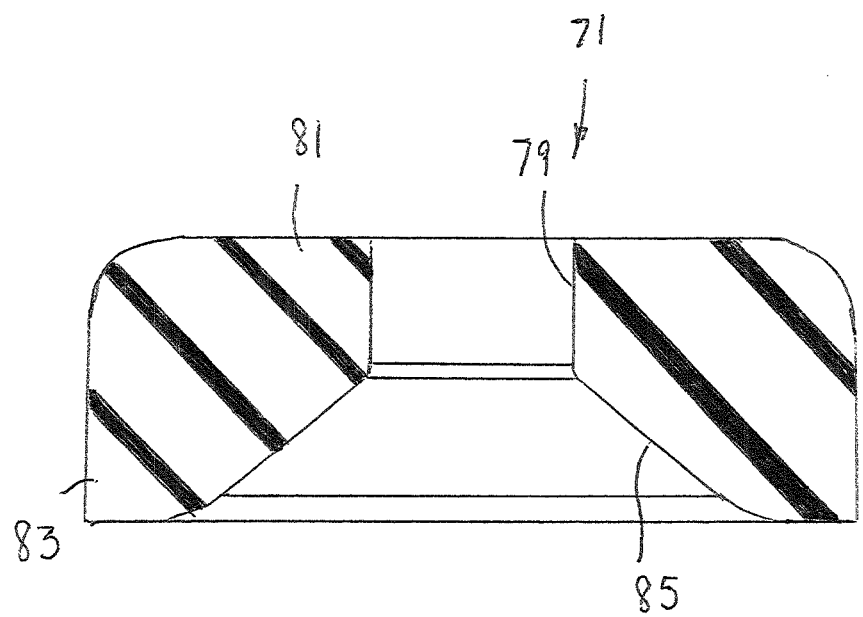
FIG. 26 is a cross-sectional view of the silicone ball housing, taken along line 26-26 of FIG. 27.
Figure 27:
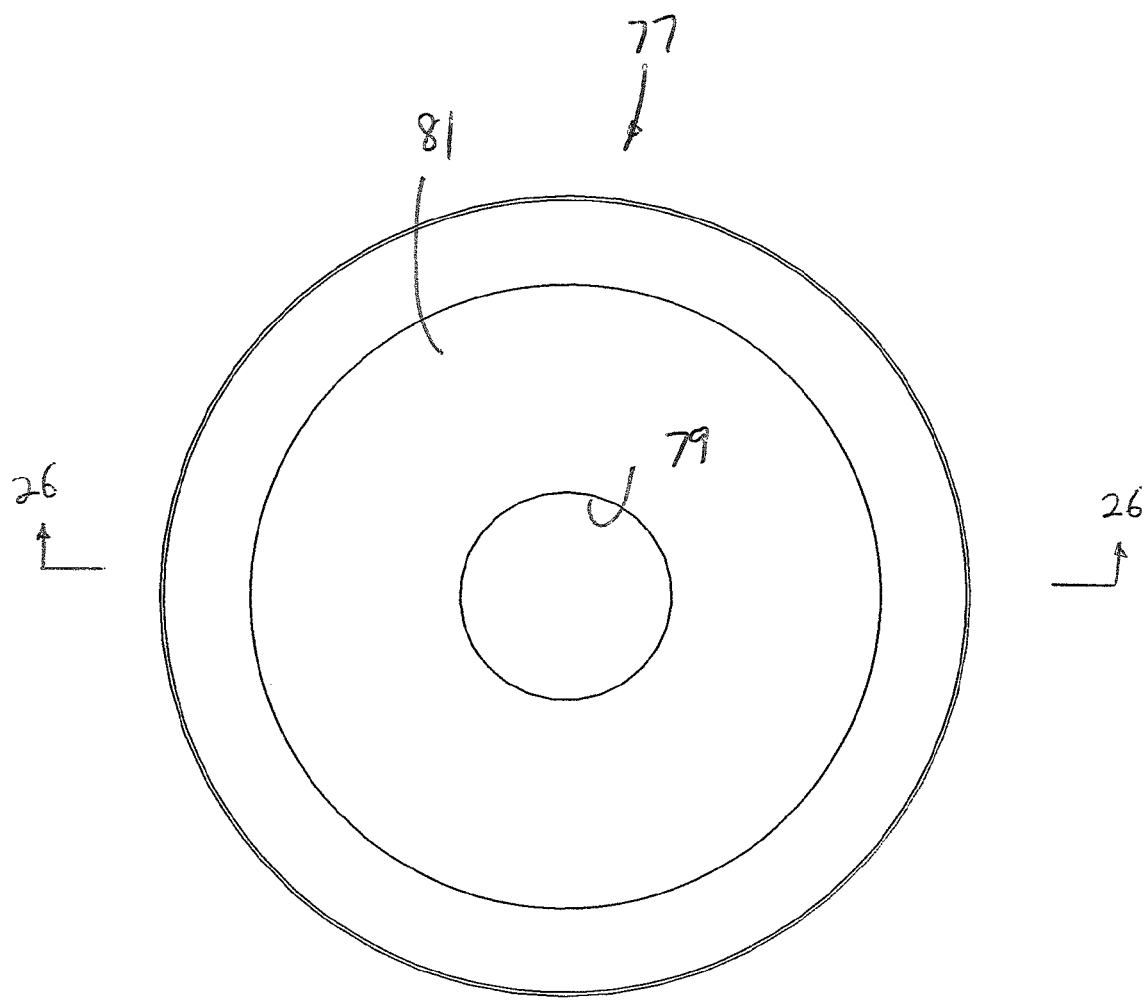
FIG. 27 is a top plan view of the silicone ball housing.
Figure 28:
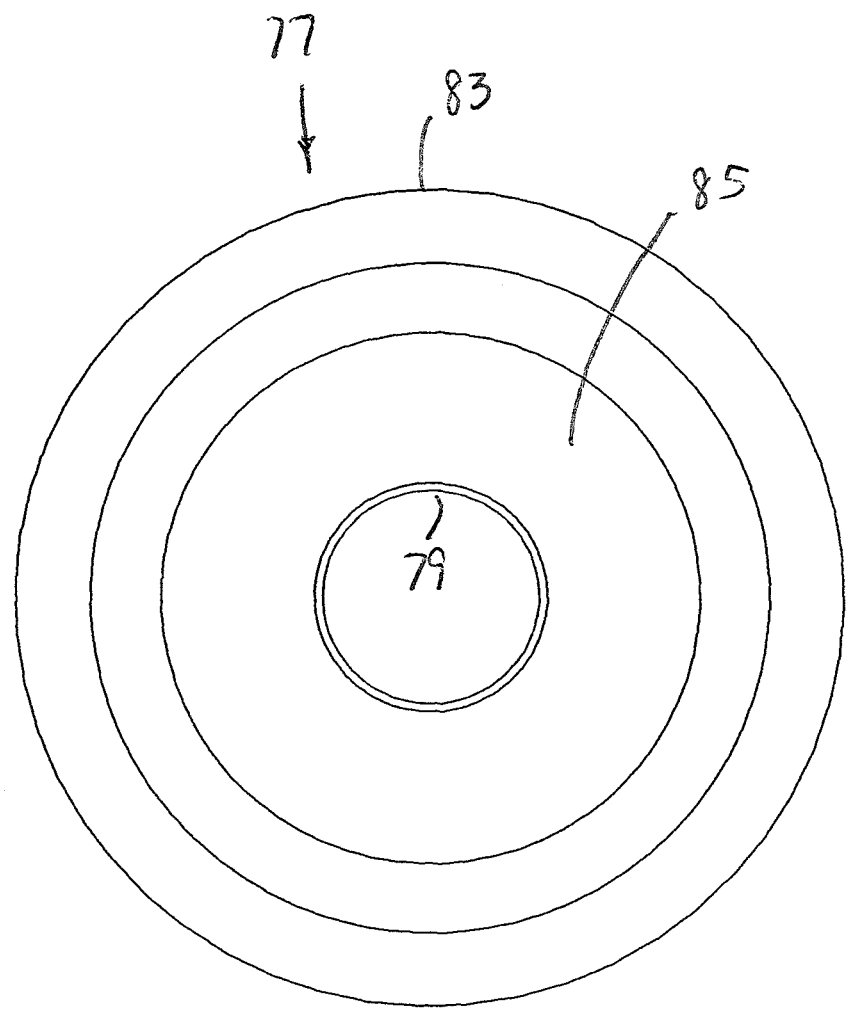
FIG. 28 is a bottom plan view of the silicone ball housing.
Figure 29:
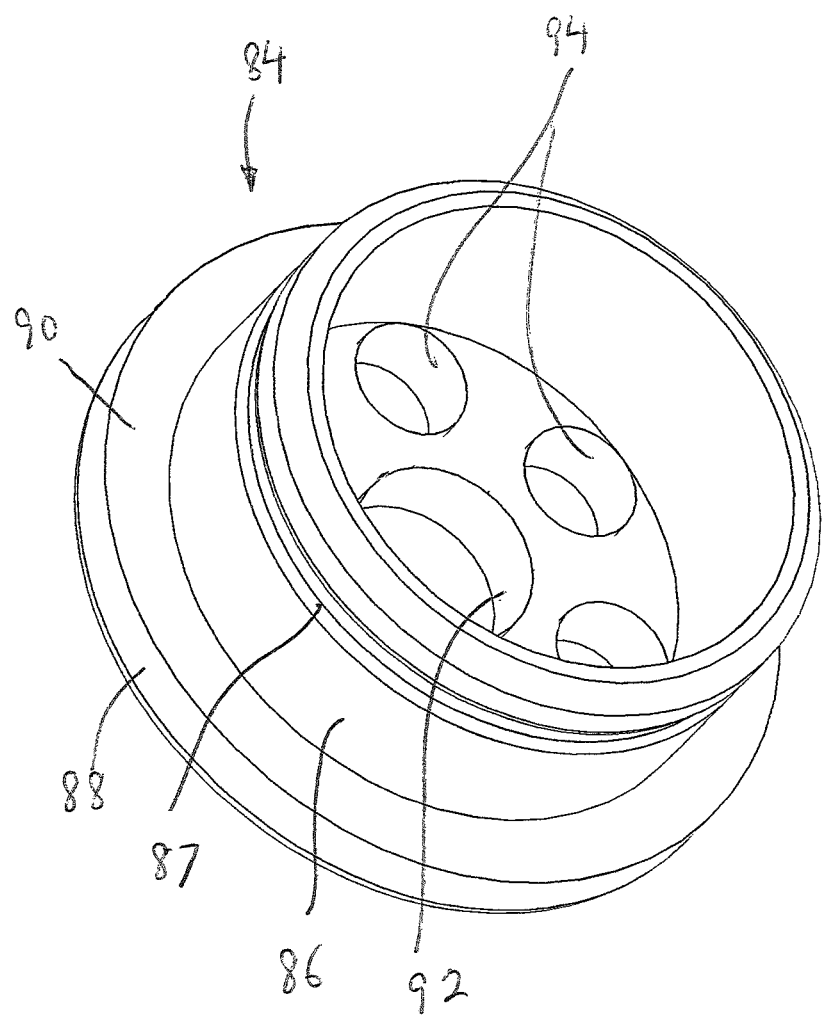
FIG. 29 is a top perspective view of the float valve cover of the brewable beverage making cup adaptor.
Figure 30:
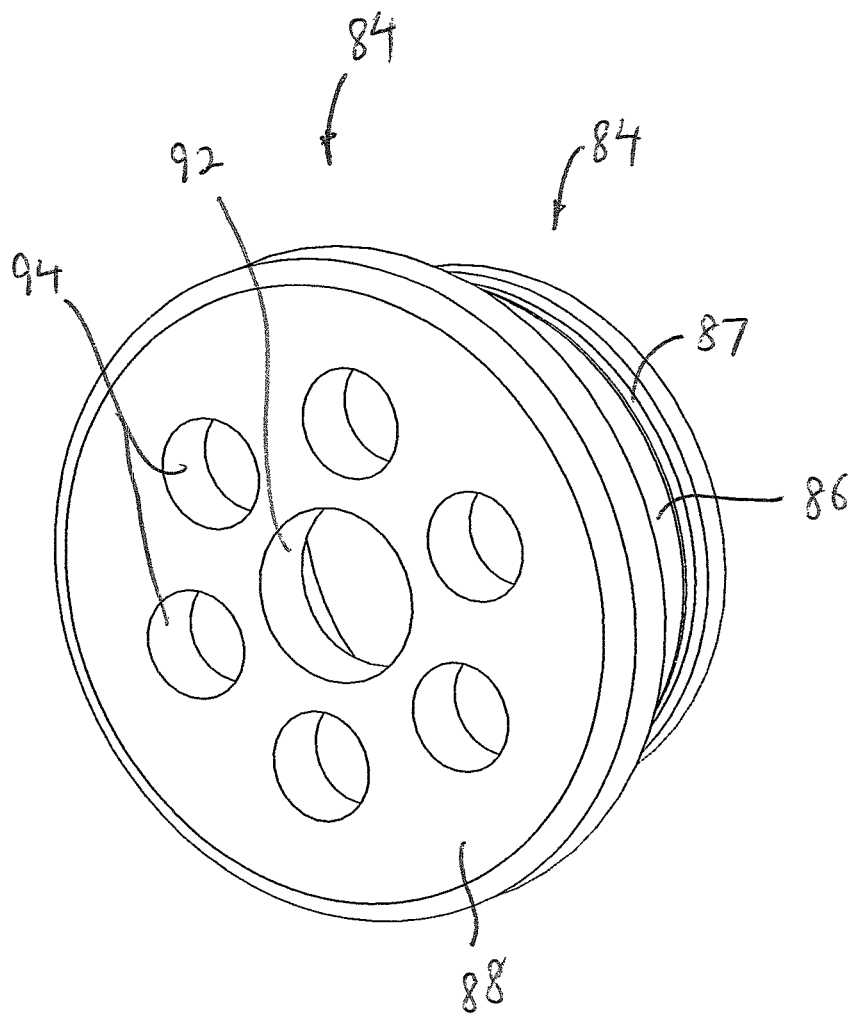
FIG. 30 is a bottom perspective view of the float valve cover.
Figure 31:
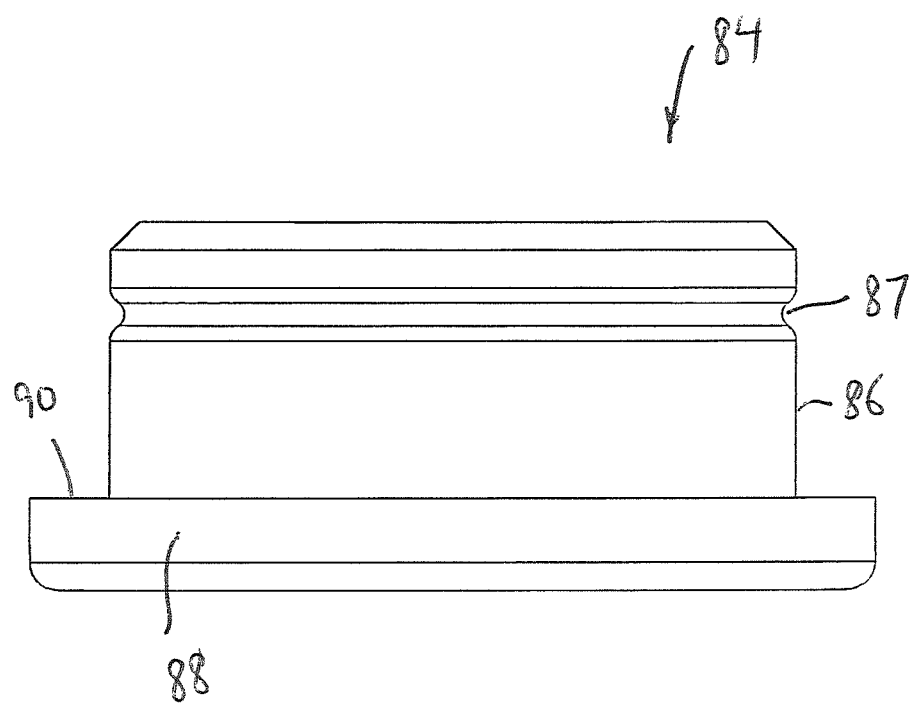
FIG. 31 is an elevational view of the float valve cover.
Figure 32:
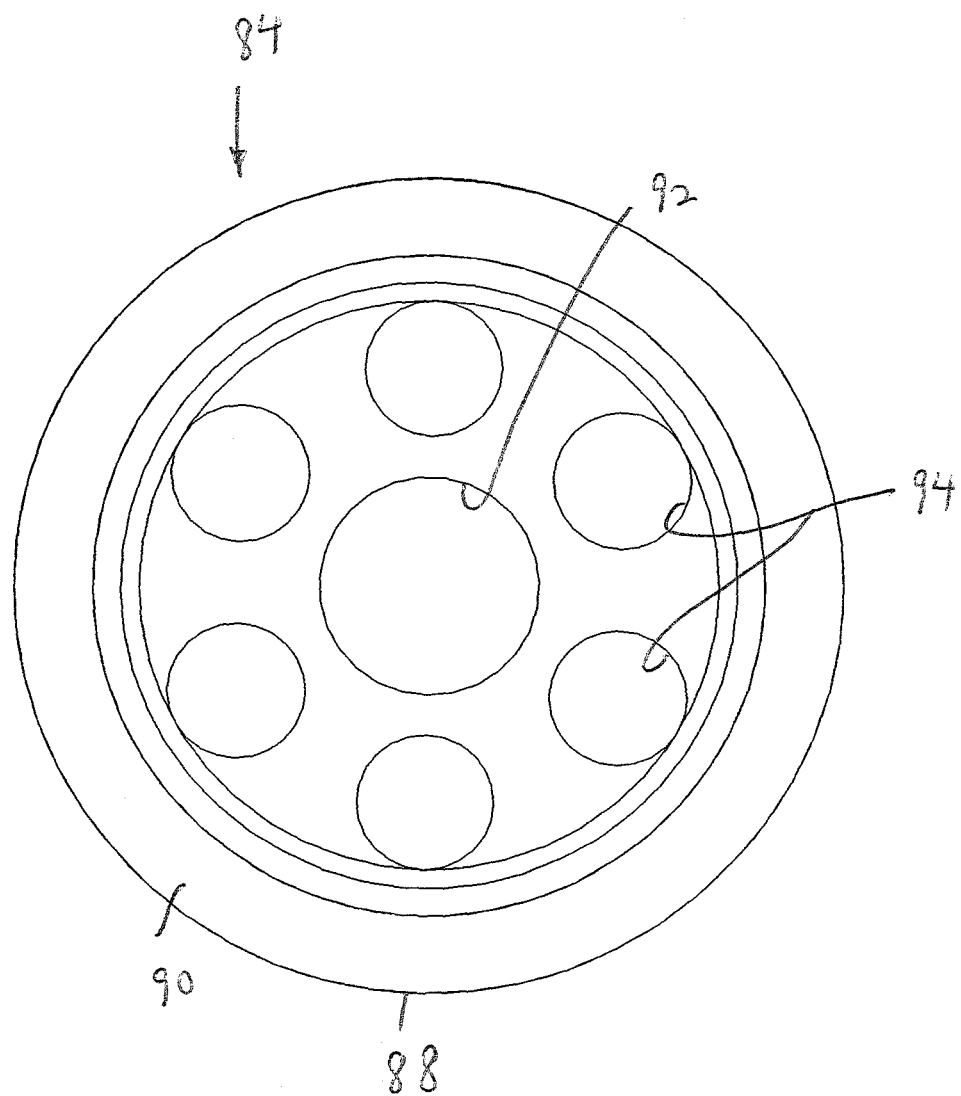
FIG. 32 is a top plan view of the float valve cover.
Figure 33:
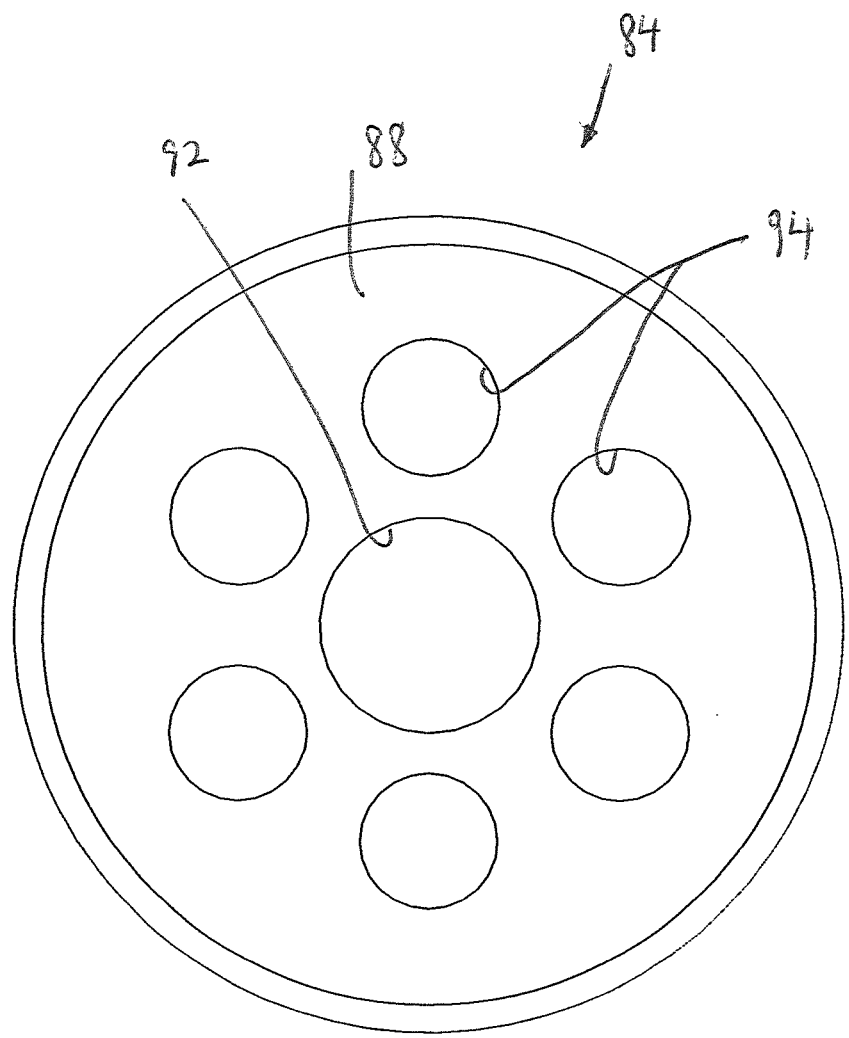
FIG. 33 is a bottom plan view of the float valve cover.
Figure 34:
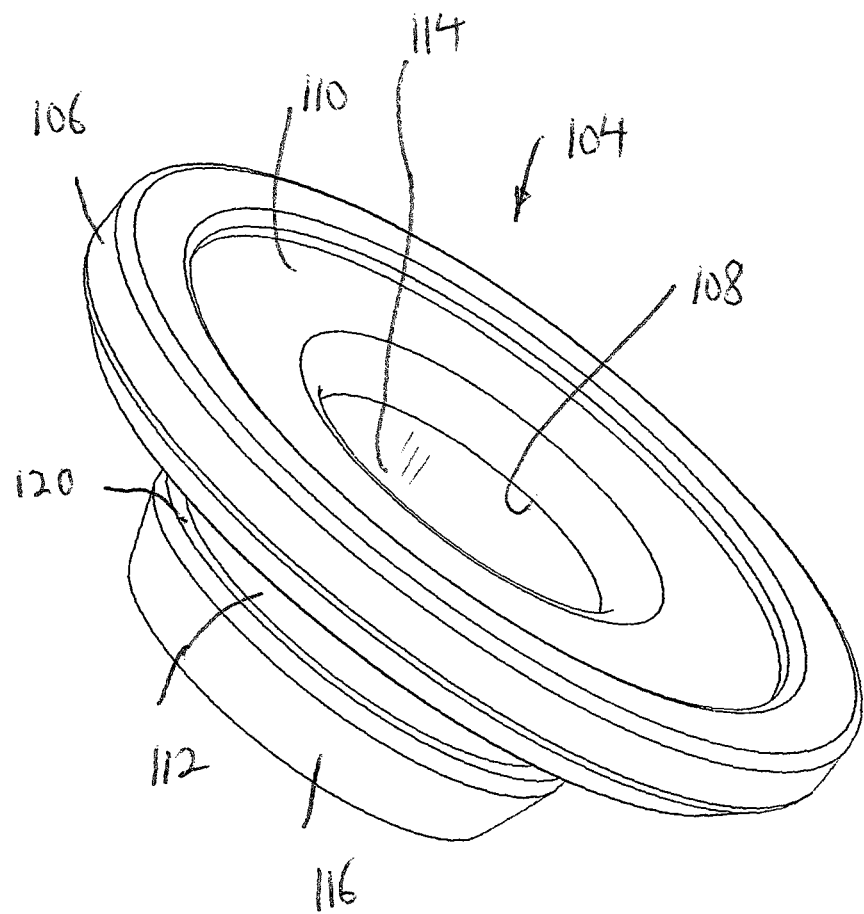
FIG. 34 is a top perspective view of the cover sealing member of the brewable beverage making cup adaptor.
Figure 35:
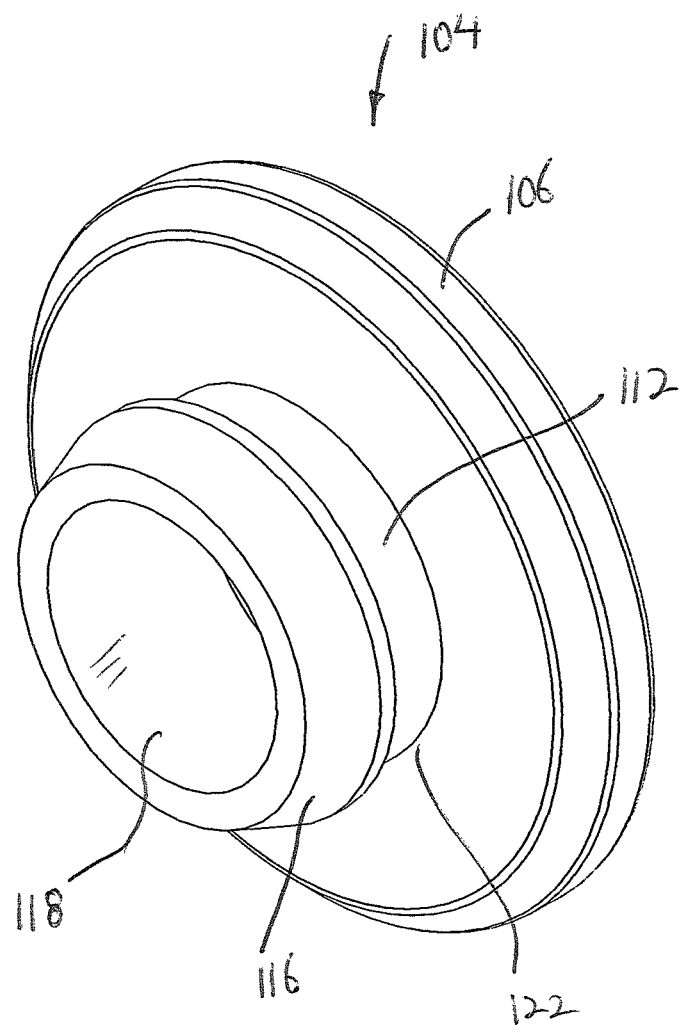
FIG. 35 is a bottom perspective view of the cover sealing member.
Figure 36:
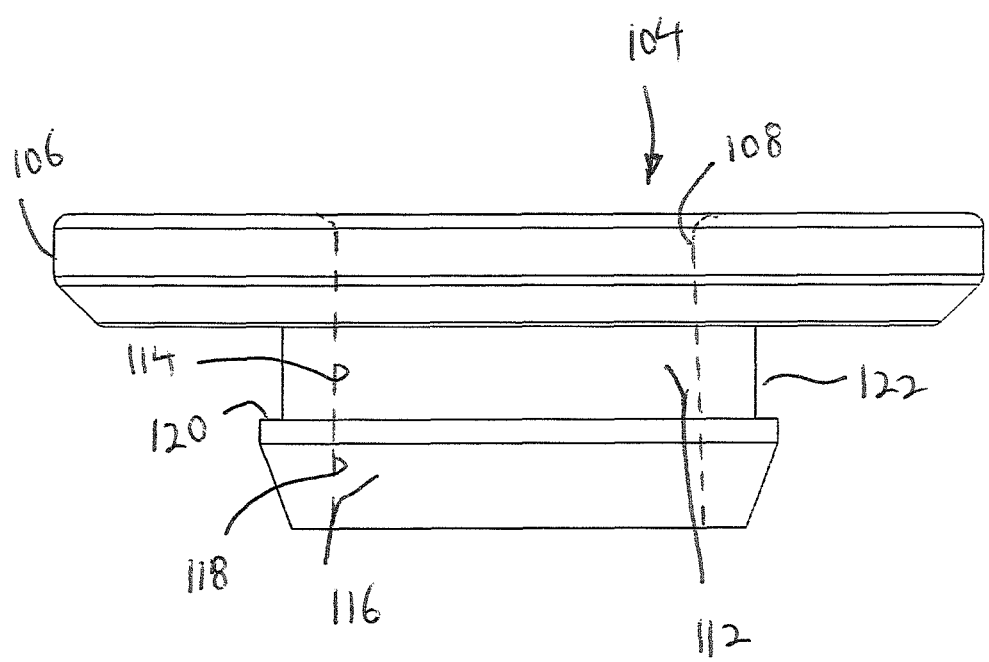
FIG. 36 is an elevational view of the cover sealing member.
Figure 37:
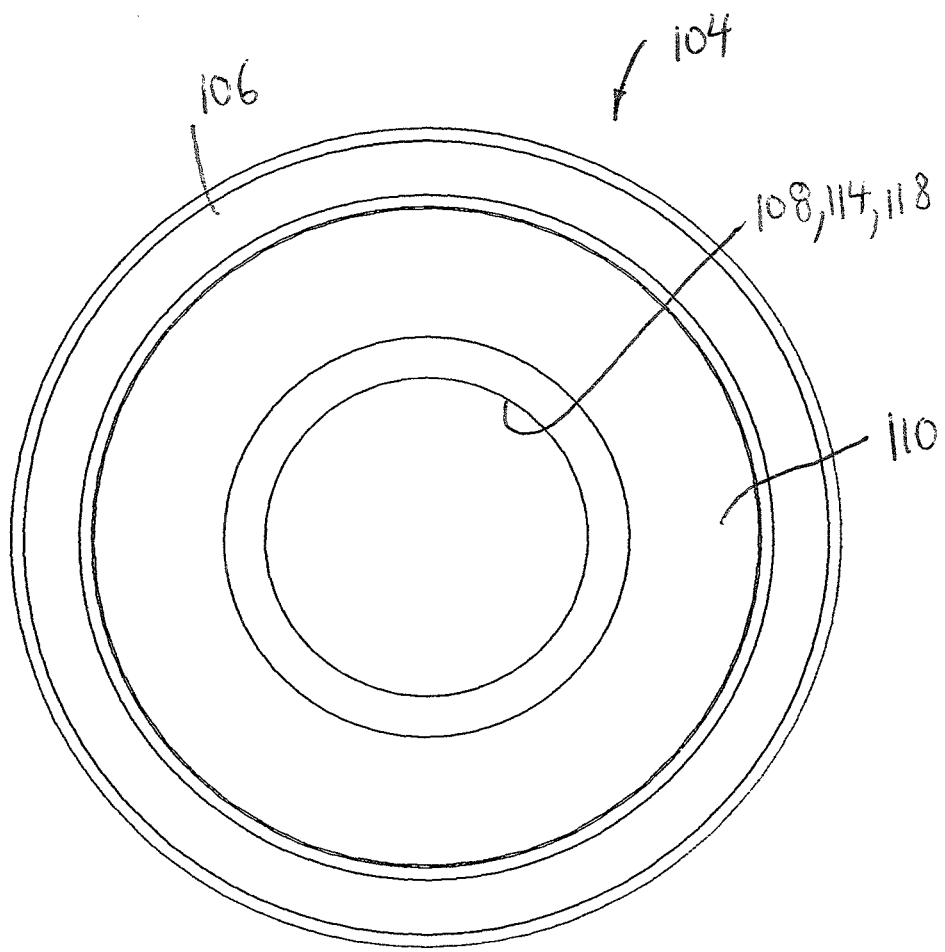
FIG. 37 is a top plan view of the cover sealing member.
Figure 38:
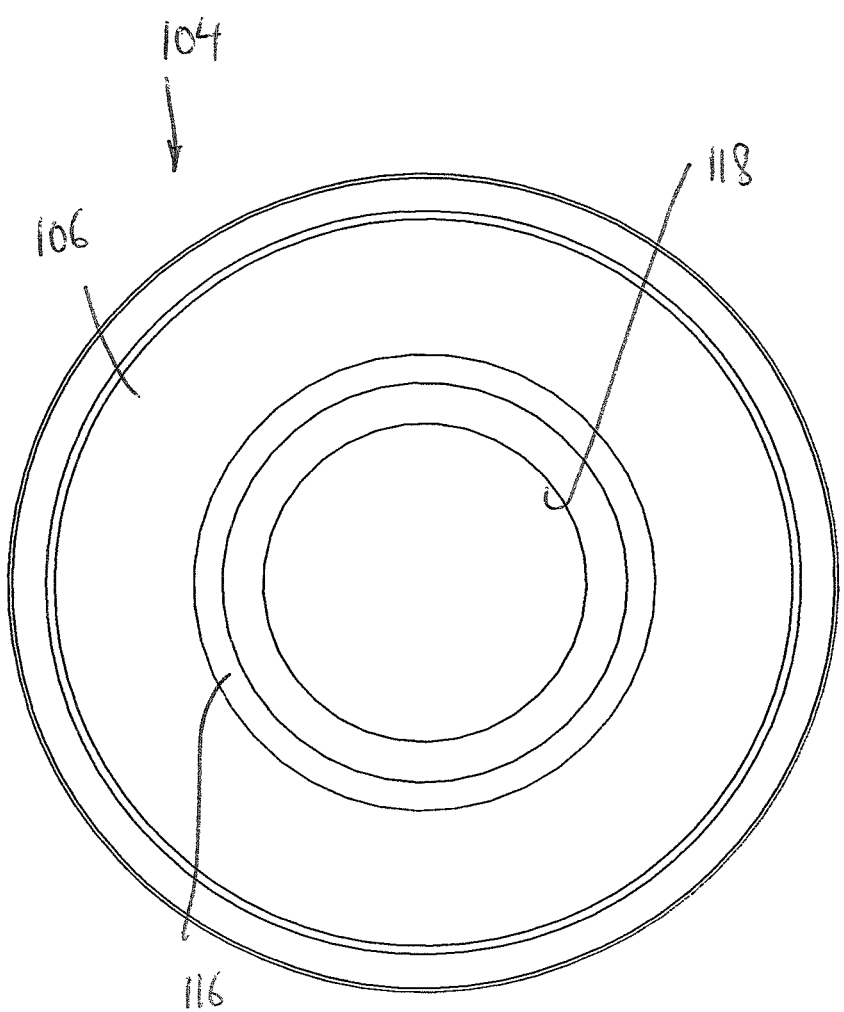
FIG. 38 is a bottom plan view of the cover sealing member.
Figure 39:
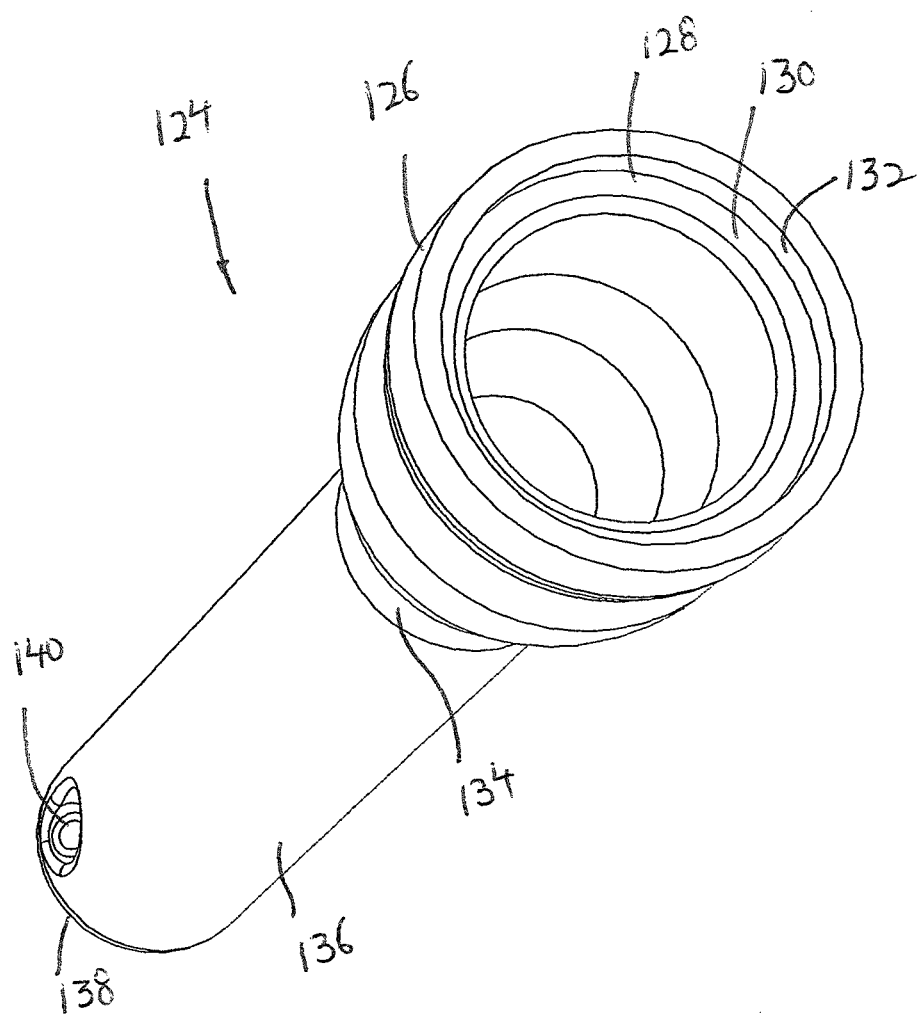
FIG. 39 is a top perspective view of the water entrance tube of the brewable beverage making cup adaptor.
Figure 40:
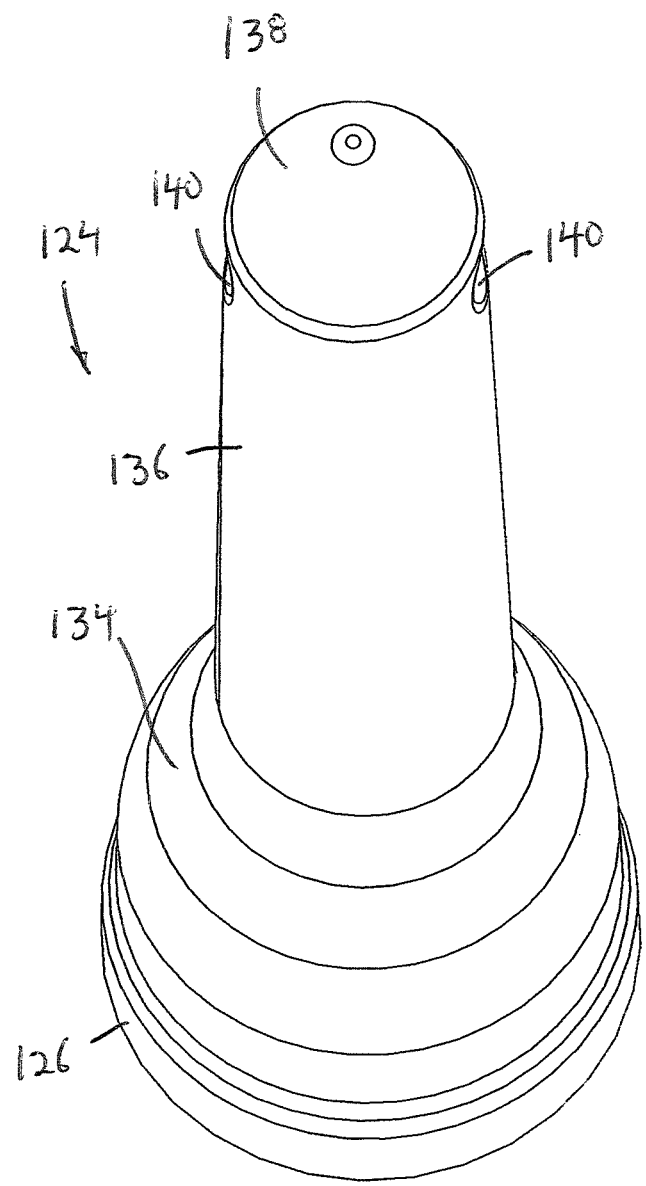
FIG. 40 is a bottom perspective view of the water entrance tube.
Figure 41:
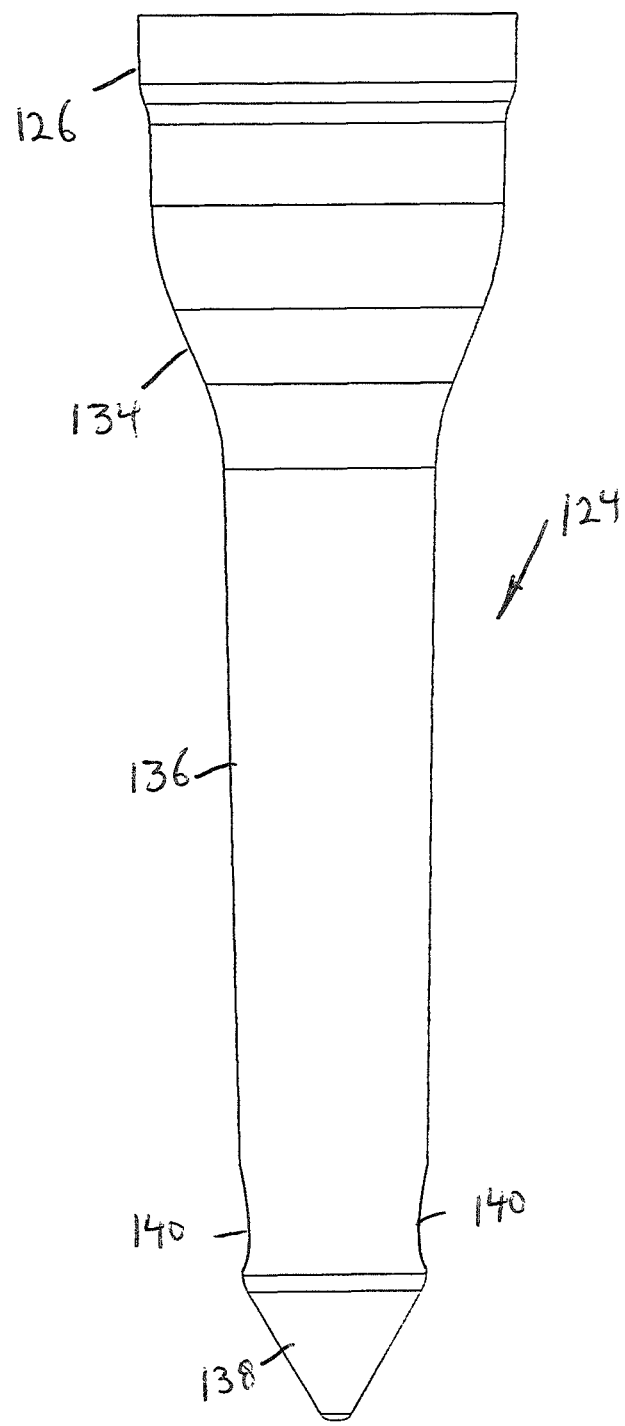
FIG. 41 is a front elevational view of the water entrance tube.
Figure 42:
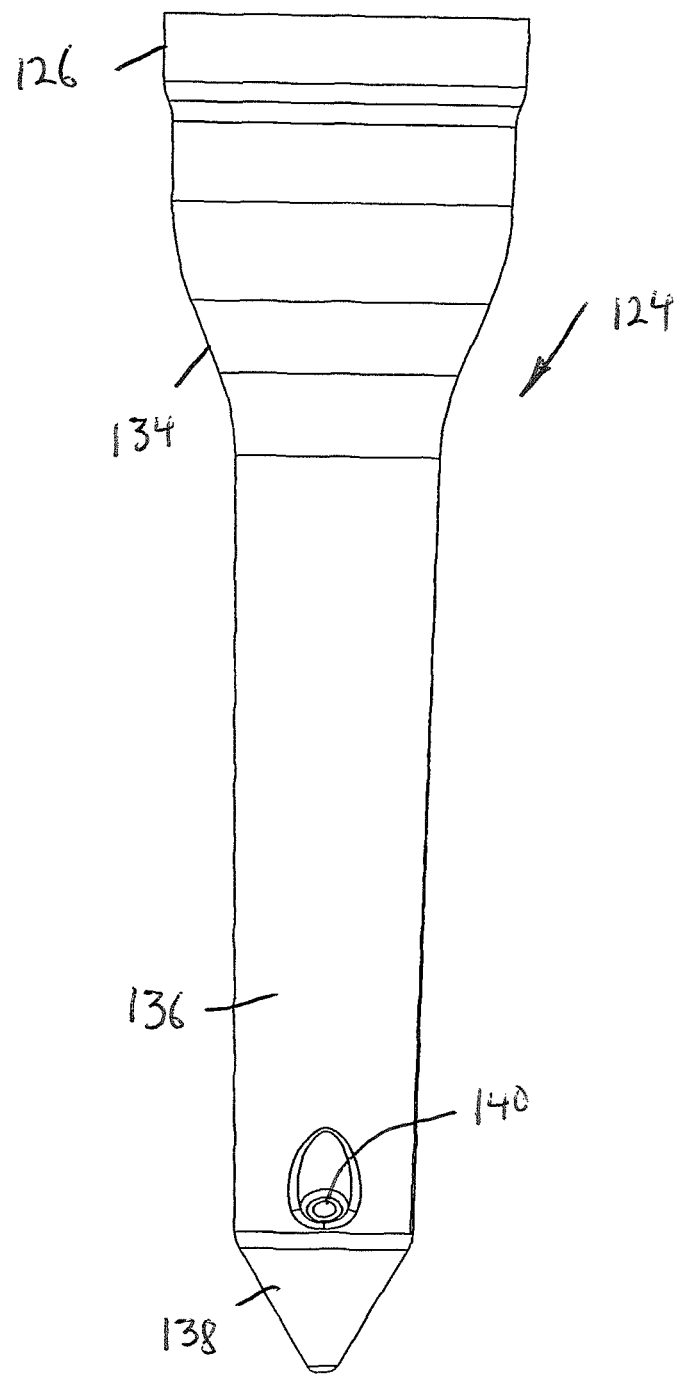
FIG. 42 is a side elevational view of the water entrance tube.
Figure 43:
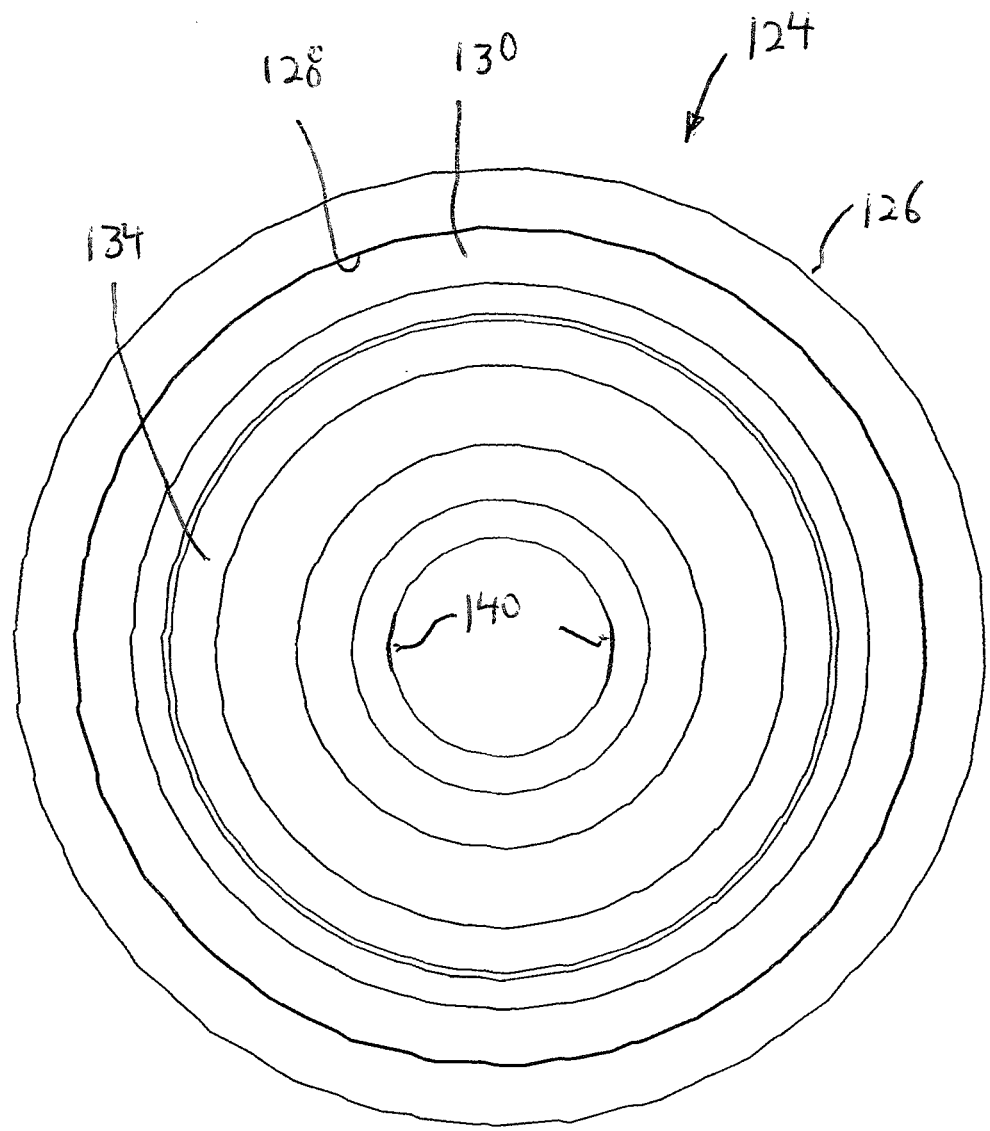
FIG. 43 is a top plan view of the water entrance tube.
Figure 44:
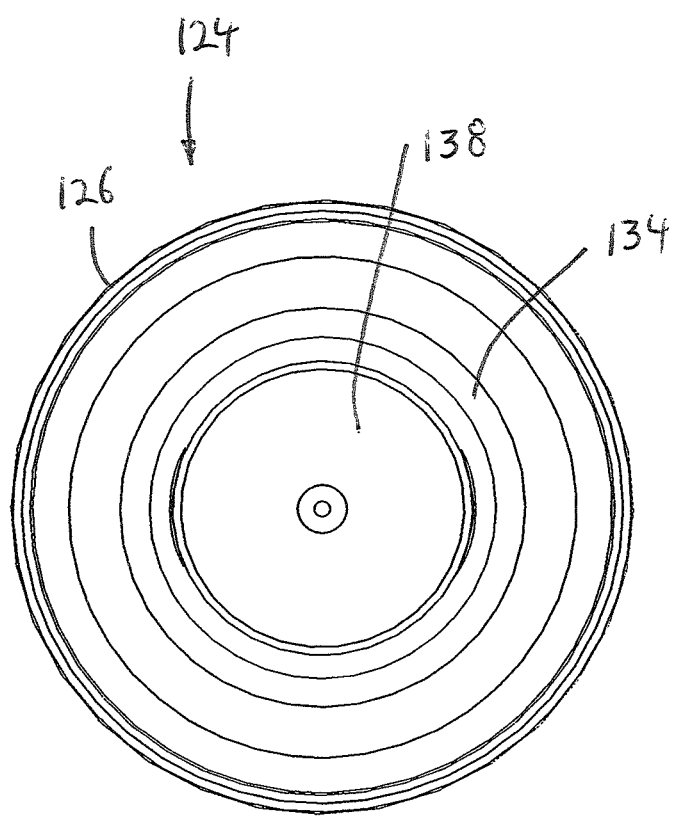
FIG. 44 is a bottom plan view of the water entrance tube.

As shown in FIGS. 1-6 and 17-22, an upper cover 50 is connected to the upper open end of upper annular wall 16. Preferably, upper cover 50 is made from a glass material, a metal material or a plastic material such as polypropylene. Upper cover 50 includes an upper annular disk 52 with a downwardly extending annular skirt 54 fixed to the outer circumference of upper annular disk 52. Annular skirt 54 is provided with an inner helical connecting thread 56 at the inner surface thereof for threadedly connecting with external helical connecting thread 20 to secured upper cover 50 to upper annular wall 16 of cup body 14. When cover 50 is connected to the upper open end of upper annular wall 16, an annular sealing ring 57 (FIGS. 5, 6 and 23), preferably of a silicone material, is positioned between the lower surface of upper annular wall 52 and the upper edge of upper annular wall 16 to provide a seal thereat. In this regard, the upper edge of upper annular wall 16 preferably has a plurality of sharp concentric rings 17 that dig into annular sealing ring 57 to provide an improved seal thereat.

A first inner annular wall 58 having an outer diameter equal to or slightly less than the inner diameter at the inner circumferential edge 60 of upper annular wall 52, is connected to inner circumferential edge 60 by a downwardly extending annular wall 62 so that inner annular wall 58 is positioned within and below upper annular wall 52.

A second inner annular wall 64 having an outer diameter equal to or slightly less than the inner diameter at the inner circumferential edge 66 of first upper annular wall 58, is connected to inner circumferential edge 66 by a downwardly extending annular wall 68 so that second inner annular wall 64 is positioned within and below first inner annular wall 58. Second inner annular wall 64 has a central opening 69 defined by an inner circumferential surface 67 thereof. An annular boss 70 extends downwardly from the lower surface of second inner annular wall 64, spaced slightly inwardly from the inner circumference thereof and in surrounding relation to central opening 69, so as to create an annular lower facing shoulder 71 at the lower surface of second inner annular wall 64, just to the inside of annular boss 70.

Upper annular wall 52 includes a part-circular cut-away portion 72 extending from the inner circumferential edge 60 thereof, and downwardly extending annular wall 62 has a bulge portion 74 that is shaped to conform to part-circular cut-away portion 72. An offset opening 76 extends through first inner annular wall 58 within the confines of bulge portion 74.

An annular float valve housing 78 extends down from the underside of upper cover 50 in surrounding relation to offset opening 76, and includes two diametrically opposite slots 80 which are open at the lower edge of annular float valve housing 78, each slot extending about three-fourths the length of annular float valve housing 78. An internal circumferential bead 82 is formed at the inner surface of annular float valve housing 78, at a position about one-quarter of the length of annular float valve housing 78, measured from the lower edge thereof.

As shown in FIGS. 5, 6 and 24-28, an annular silicone ball housing 77 is fit in the upper end of annular float valve housing 78. Annular silicone ball housing 77 is defined by an upper annular plate 81 that seats against the underside of upper cover 50 and a downwardly extending annular skirt 83 that fits tightly within annular float valve housing 78. A central opening 79 is formed in annular plate 81 in alignment with offset opening 76. The inner surface of annular skirt 83 is tapered or flared to form a flared opening 85 in communication with central opening 79.

As shown in FIGS. 5, 6 and 29-33, a float valve cover 84 closes off the lower open end of annular float valve housing 78. Float valve cover 84 includes an annular wall 86 with an outer diameter similar to the inner diameter of annular float valve housing 78, and with a circumferential recess 87 in the outer surface of annular wall 86 that receives internal circumferential bead 82 formed at the inner surface of annular float valve housing 78 when annular wall 86 is fit within annular float valve housing 78 so as to secure float valve cover 84 thereto. Slots 80 permit annular wall 86 to be press fit within annular float valve housing 78 so that internal circumferential bead 82 can snap fit into circumferential recess 87.

A circular bottom wall 88 is fixed to the lower edge of annular wall 86 and has a larger diameter than annular wall 86, thereby forming an outer annular ledge 90 that abuts against the lower edge of annular float valve housing 78 when annular wall 86 is fit within annular float valve housing 78. A central opening 92 is provided through circular bottom wall 88, and a plurality, for example, six, offset openings 94 are provided through circular bottom wall 88 in surrounding relation to central opening 92, around a common circle.

As a result, a chamber 100 (FIG. 5) is defined between first inner annular wall 58, annular float valve housing 78 and circular bottom wall 88. A valve ball 102 is positioned in chamber 100, the purpose for which will be explained hereafter. Preferably, valve ball 102 is made from a plastic material such as polypropylene, or other buoyant material.

Figure 18:
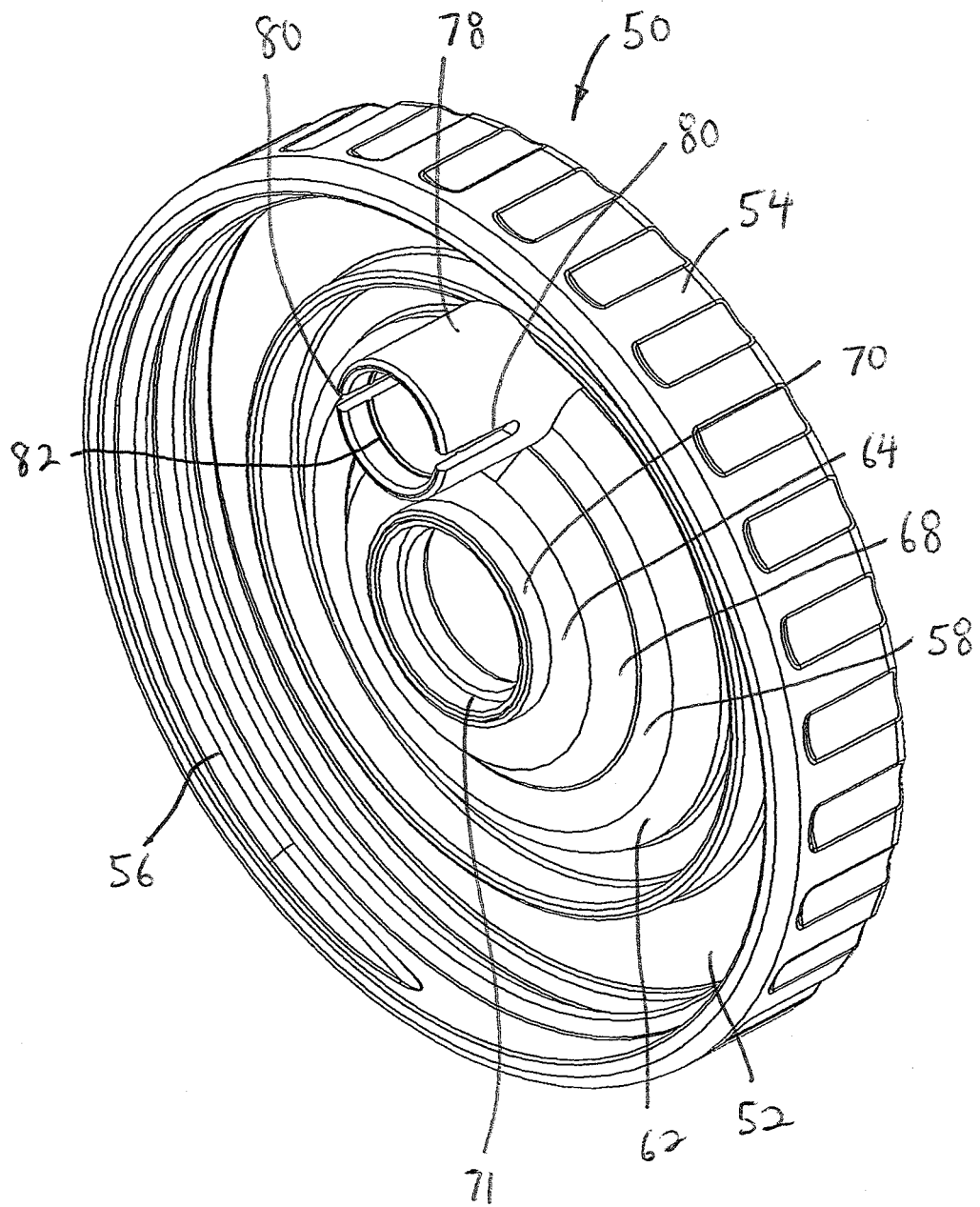
FIG. 18 is a bottom perspective view of the top cover.
Figure 18A:
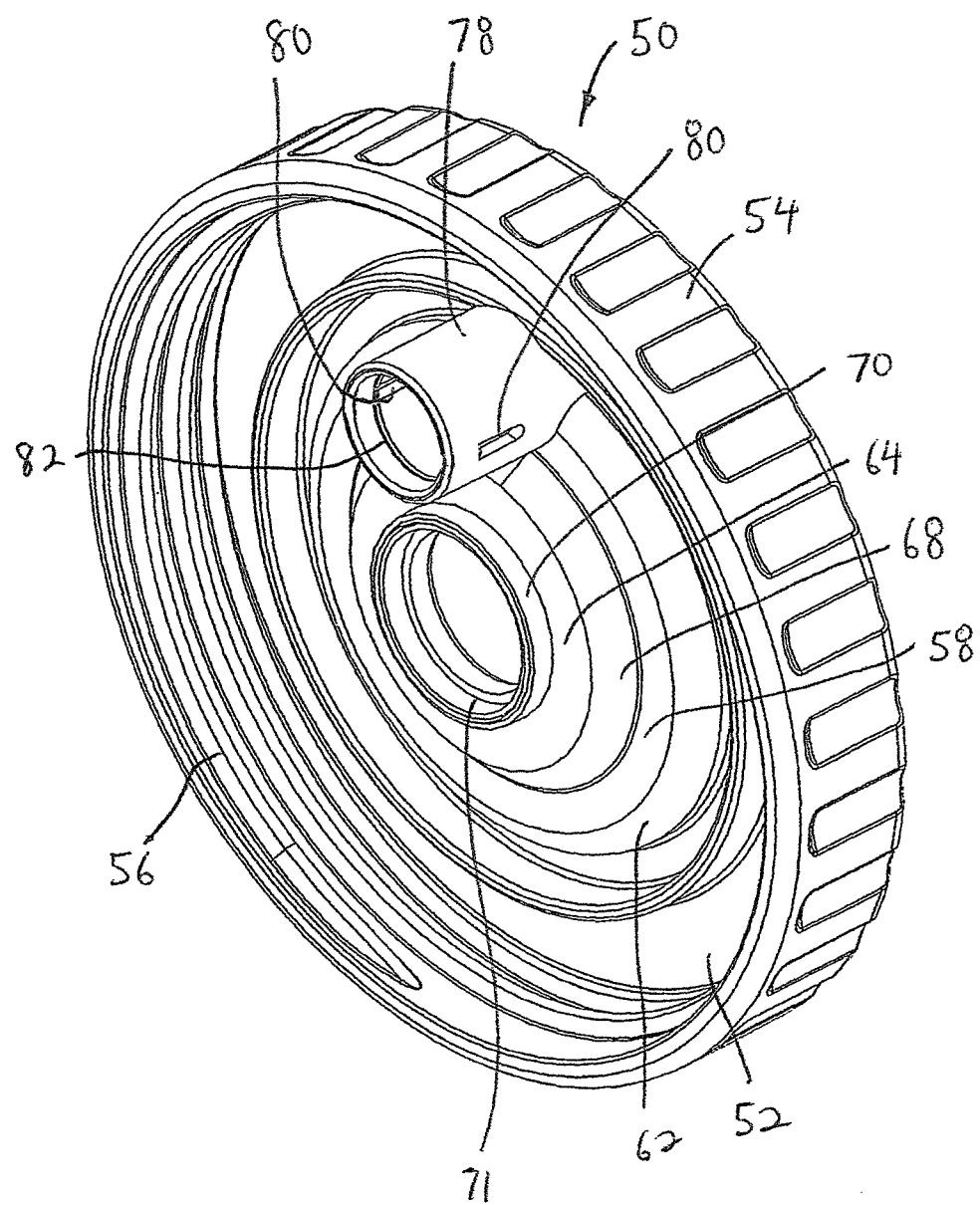
FIG. 18A is a bottom perspective view of a modified top cover.
Figure 19:
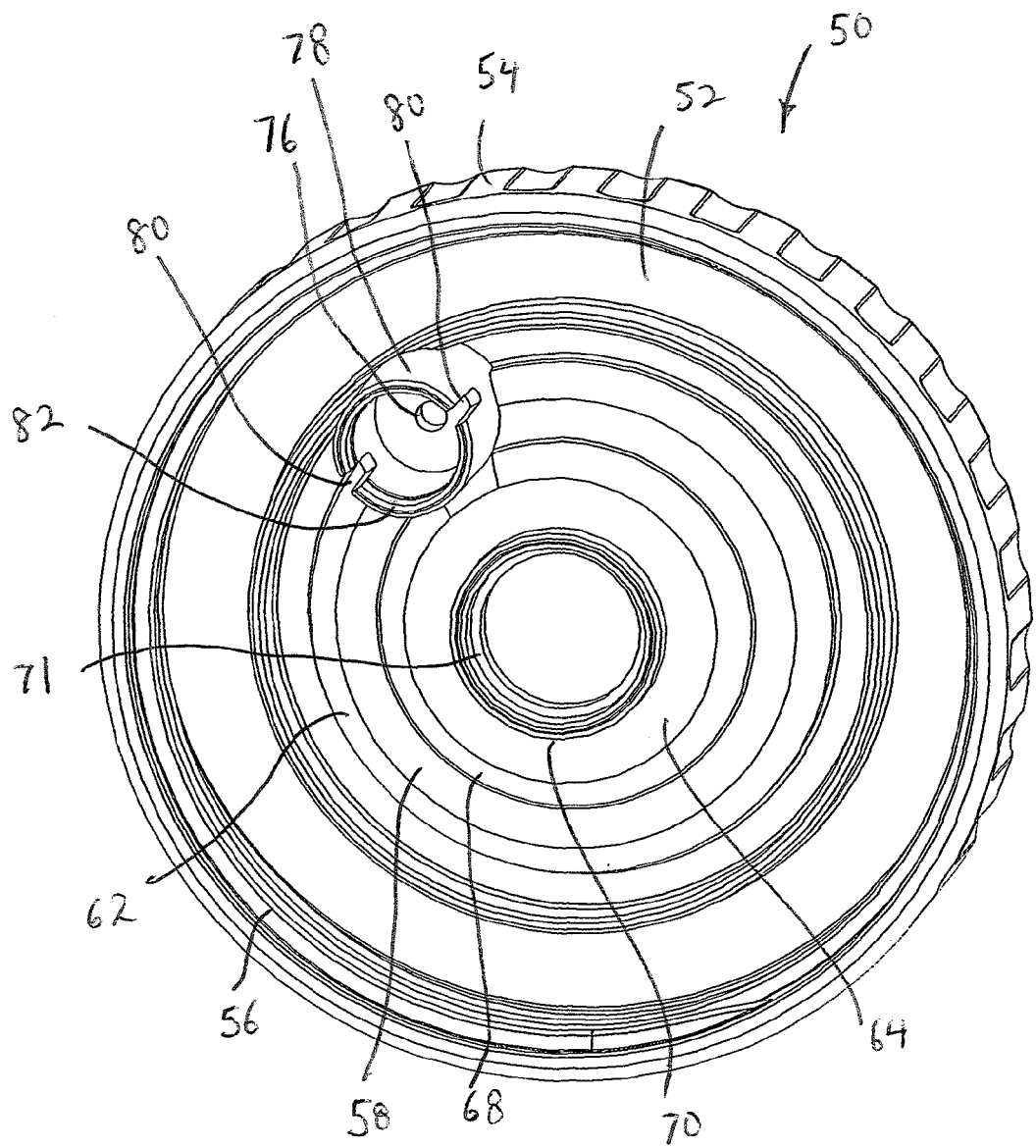
FIG. 19 is a bottom perspective view of the top cover of FIG. 18, taken from a different angle.
Figure 20:
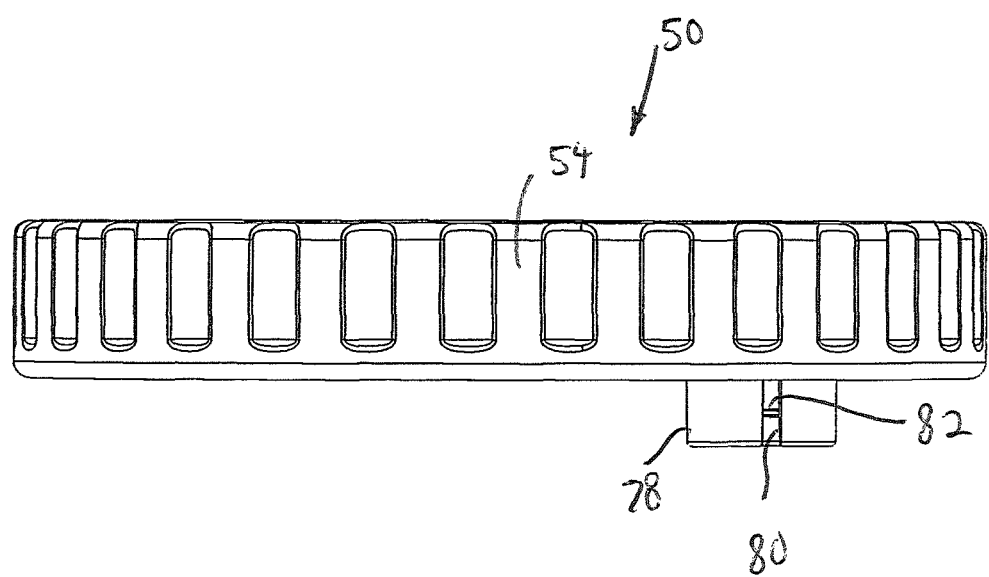
FIG. 20 is an elevational view of the top cover of FIG. 18.
Figure 21:
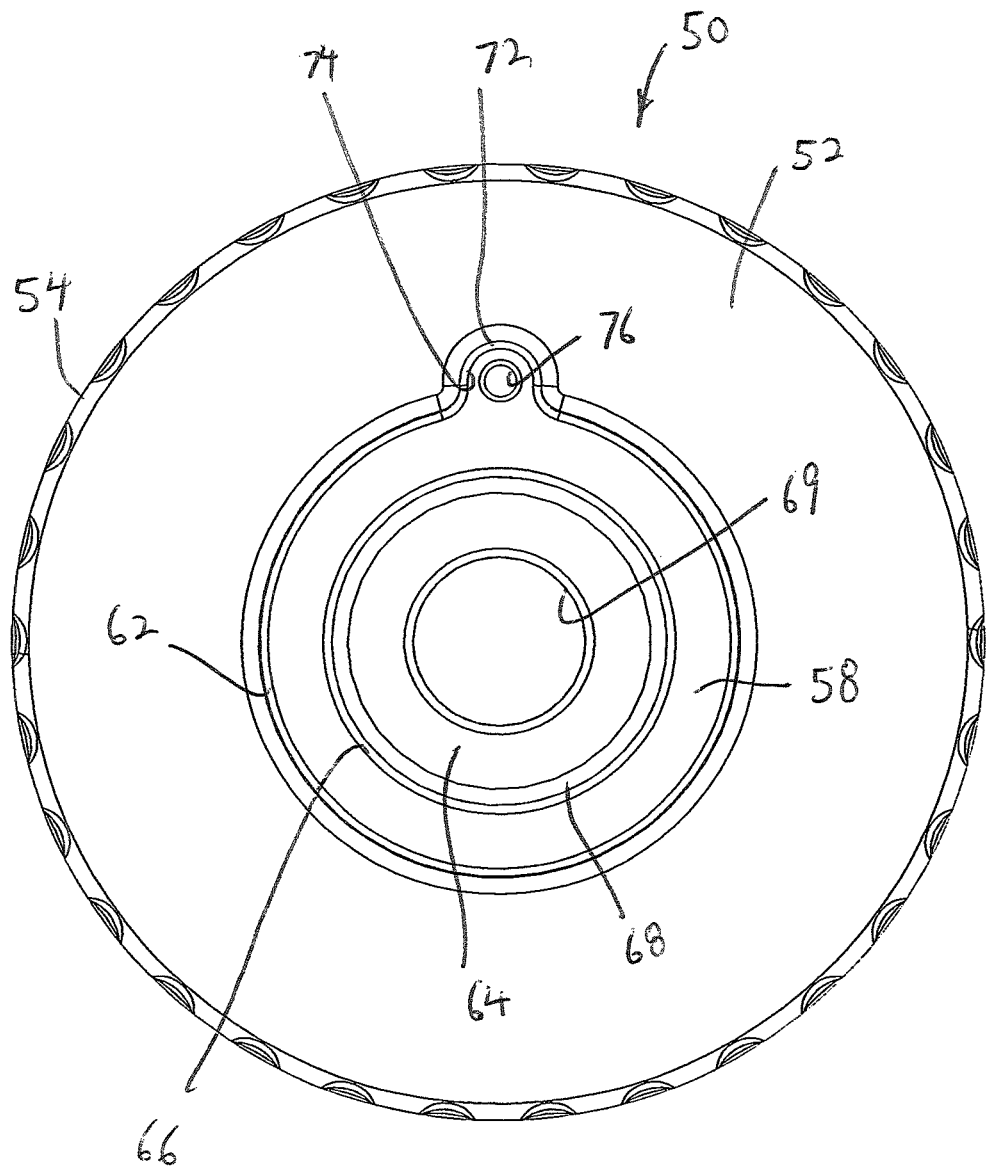
FIG. 21 is a top plan view of the top cover of FIG. 18.
Figure 22:
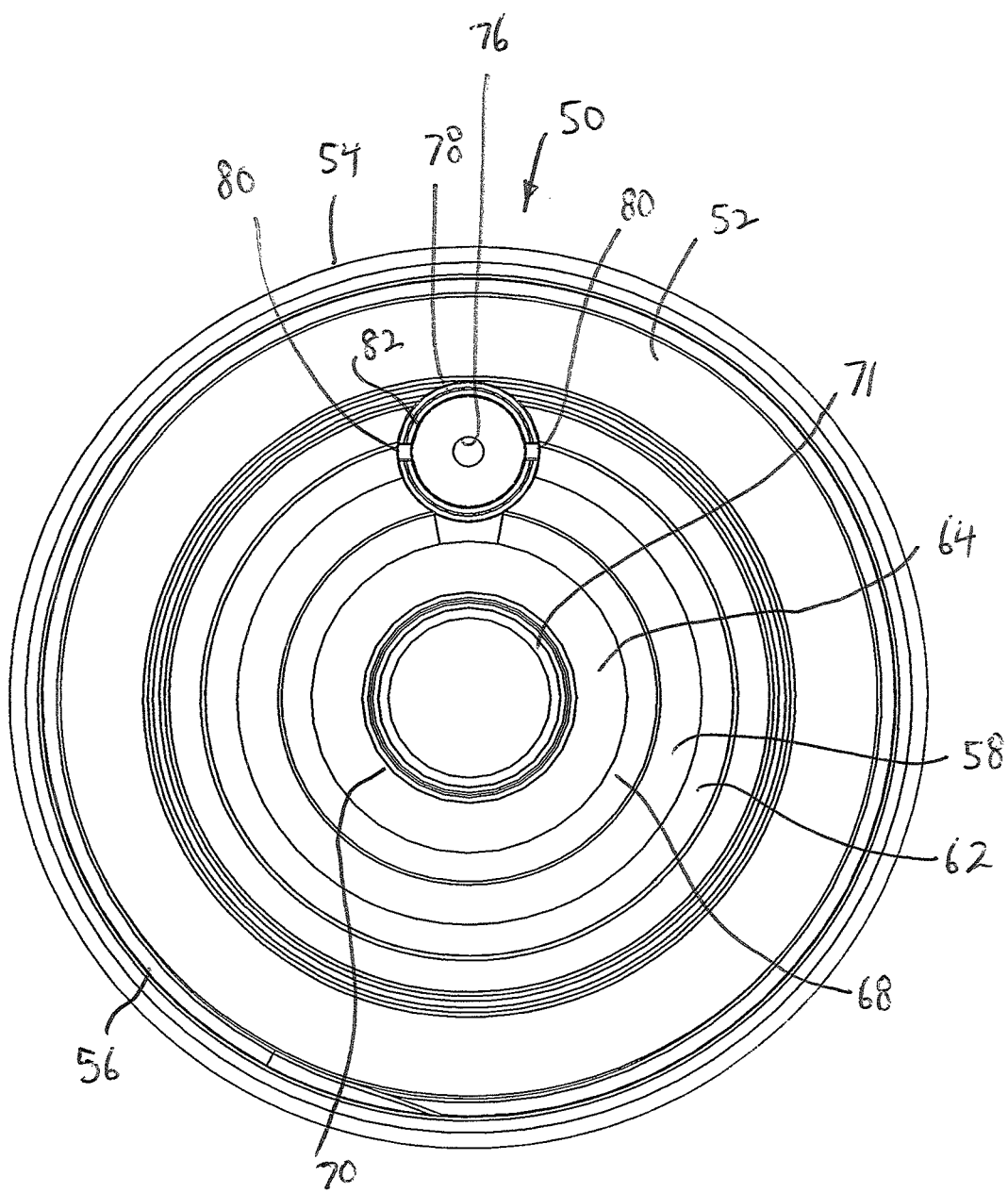
FIG. 22 is a bottom plan view of the top cover of FIG. 18.

Alternatively, slots 80 can be closed at the lower end thereof, as shown in FIG. 18A, and in such case, the lower end of slots 80 would start at or above the upper end of annular wall 86 of float valve cover 84. In this modification, slots 80 allow any trapped water to escape valve housing 78, that is, to prevent water from being trapped in valve housing 78 at the end of an operation.

Figure 5:
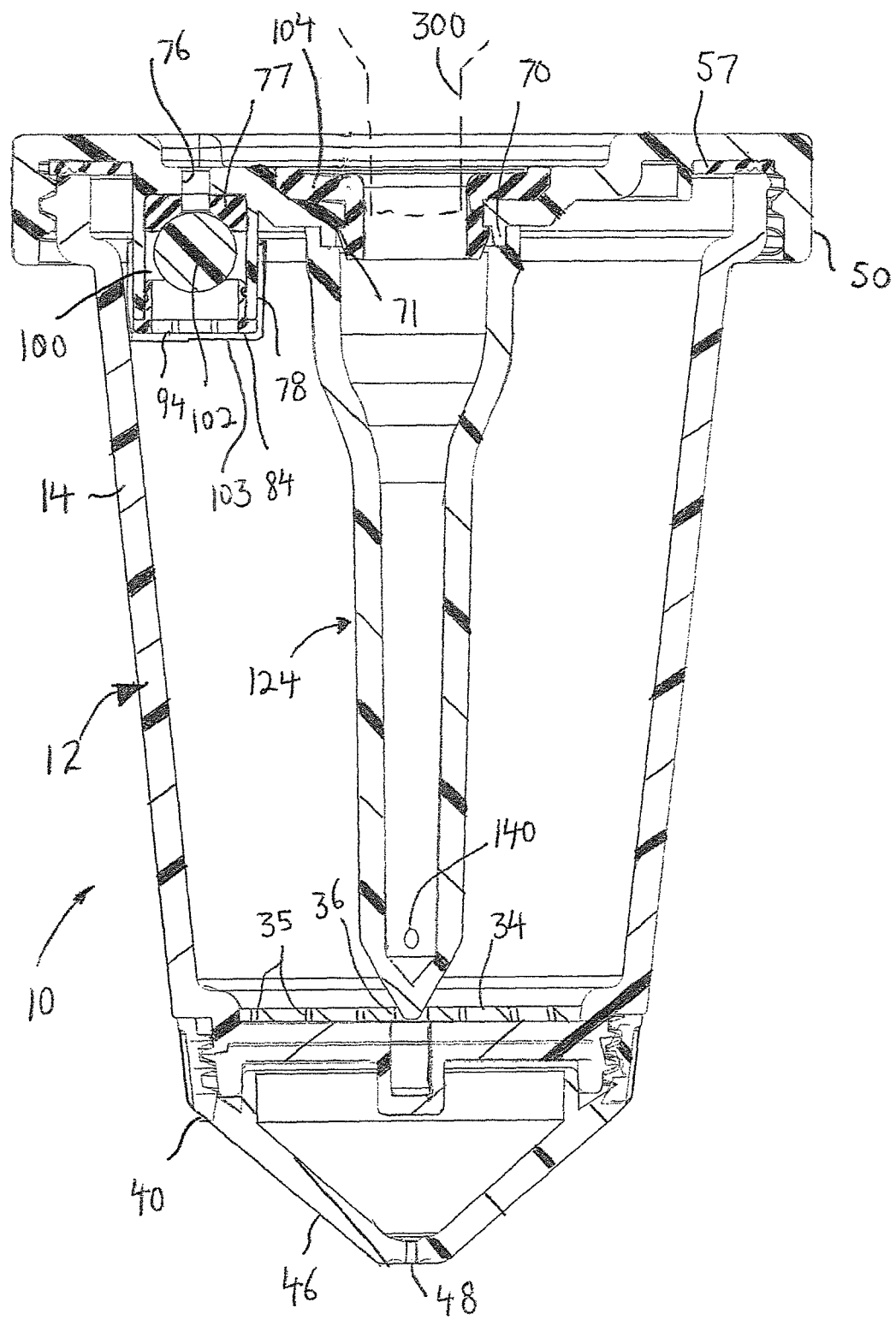
FIG. 5 is a cross-sectional view of the brewable beverage making cup adaptor of FIG. 1, taken along line 5-5 thereof.
Figure 6:
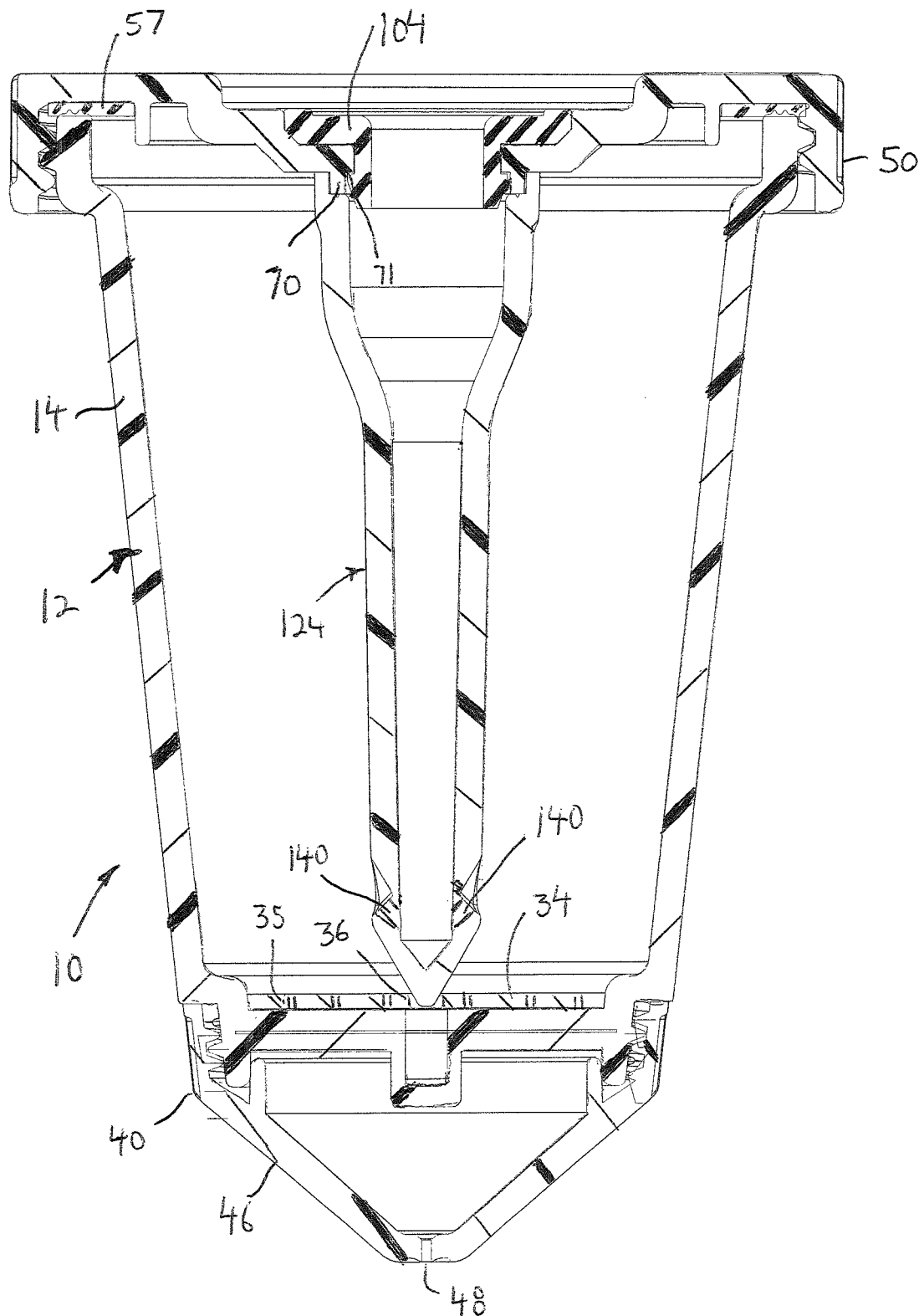
FIG. 6 is a cross-sectional view of the brewable beverage making cup adaptor of FIG. 1, taken along line 6-6 thereof.
Figure 7:
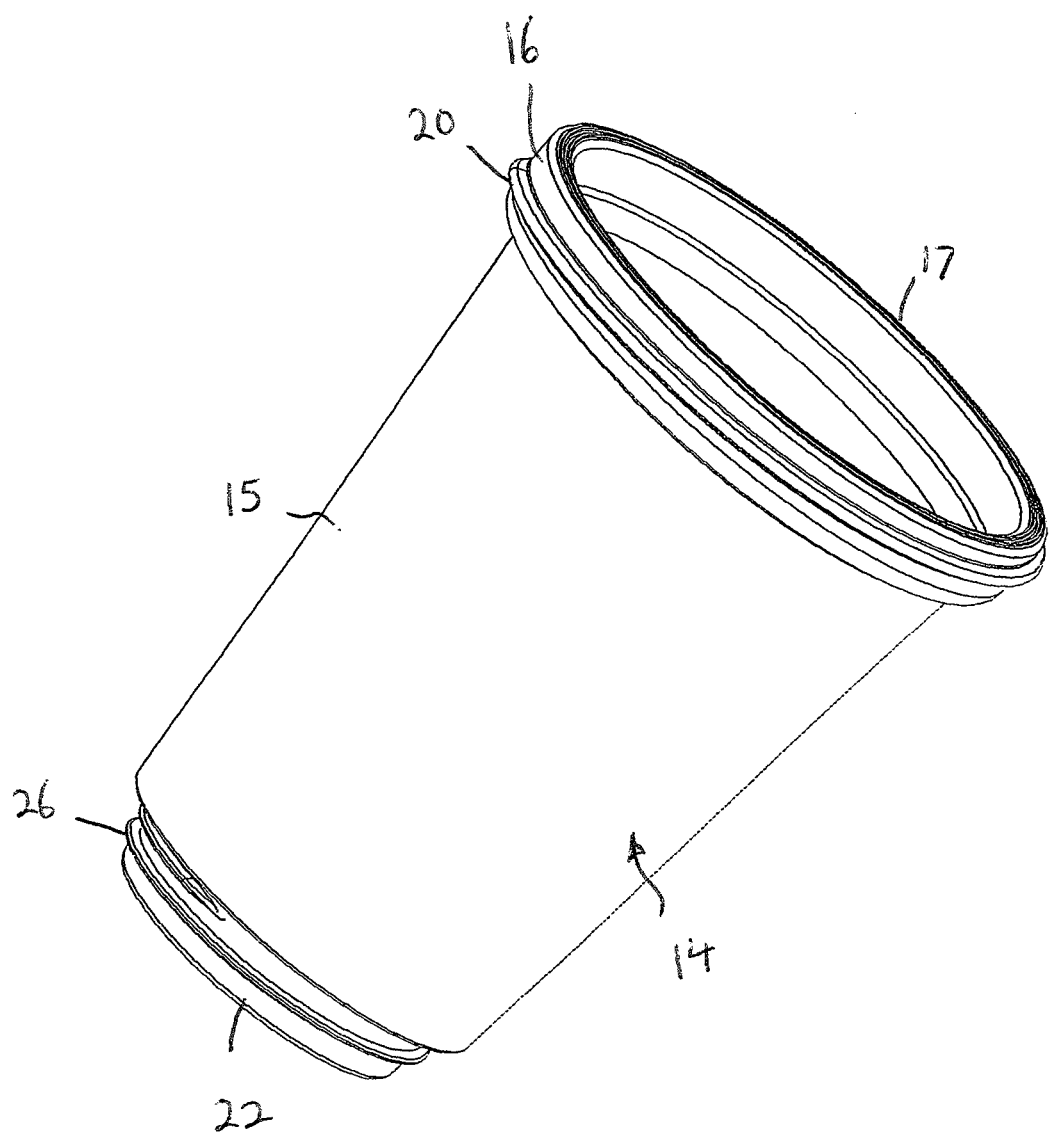
FIG. 7 is a top perspective view of the cup body of the brewable beverage making cup adaptor.
Figure 8:
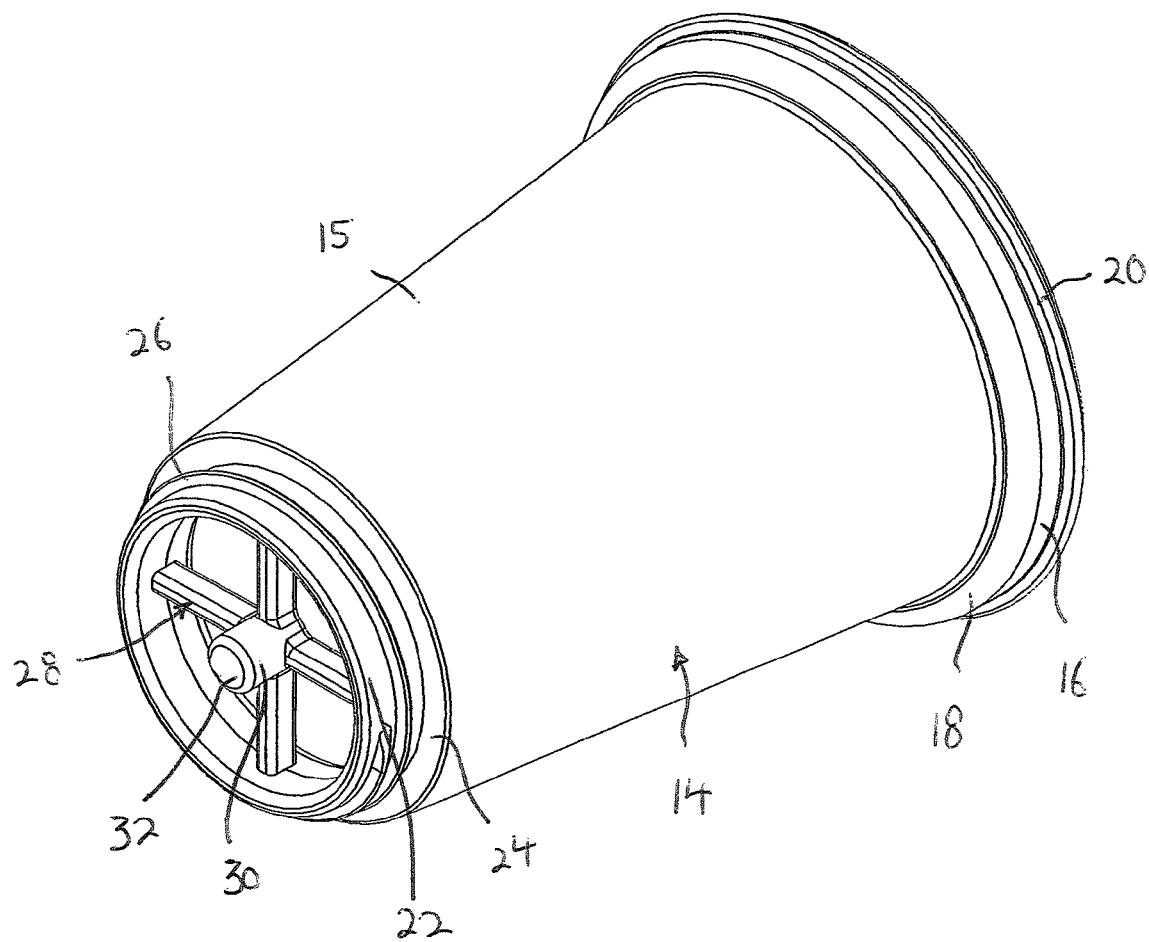
FIG. 8 is a bottom perspective view of the cup body.
Figure 9:
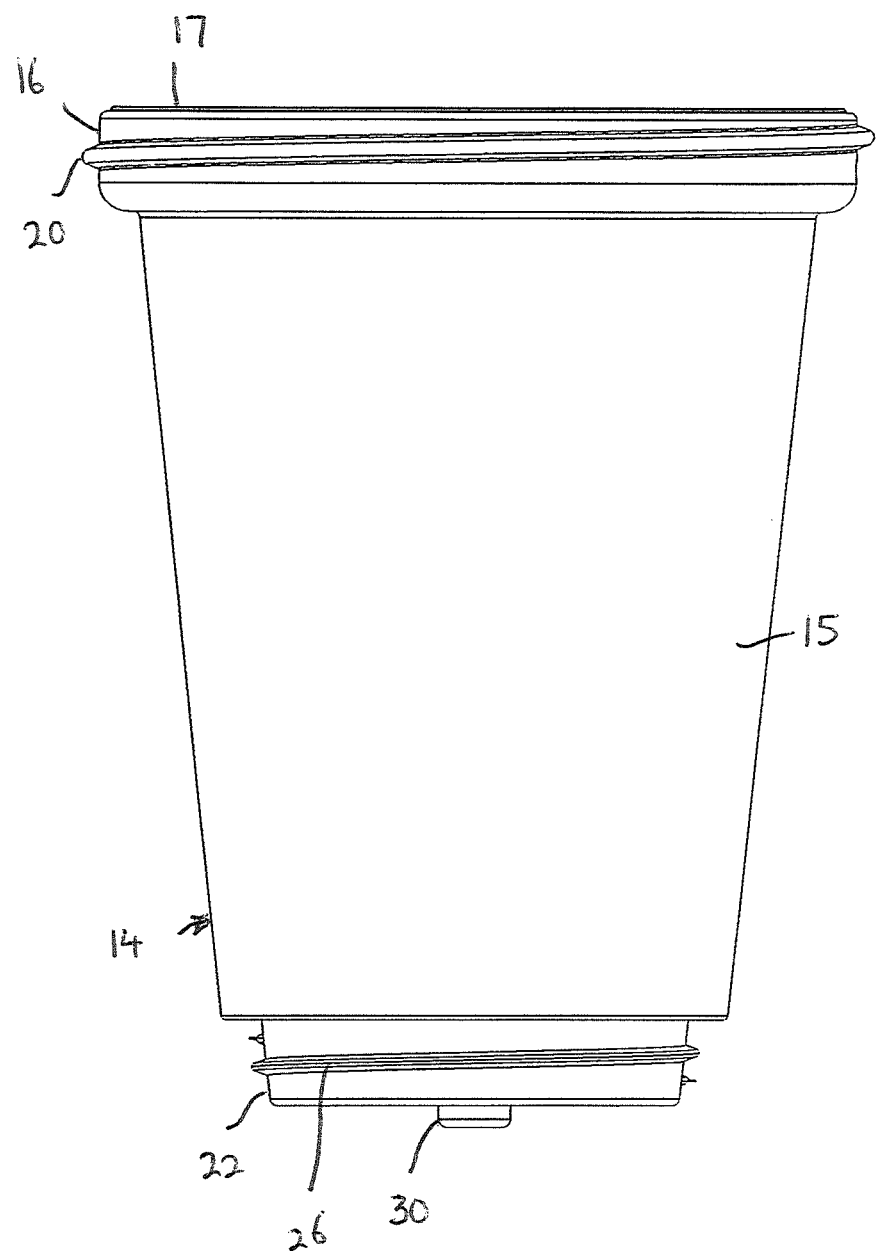
FIG. 9 is an elevational view of the cup body.
Figure 10:
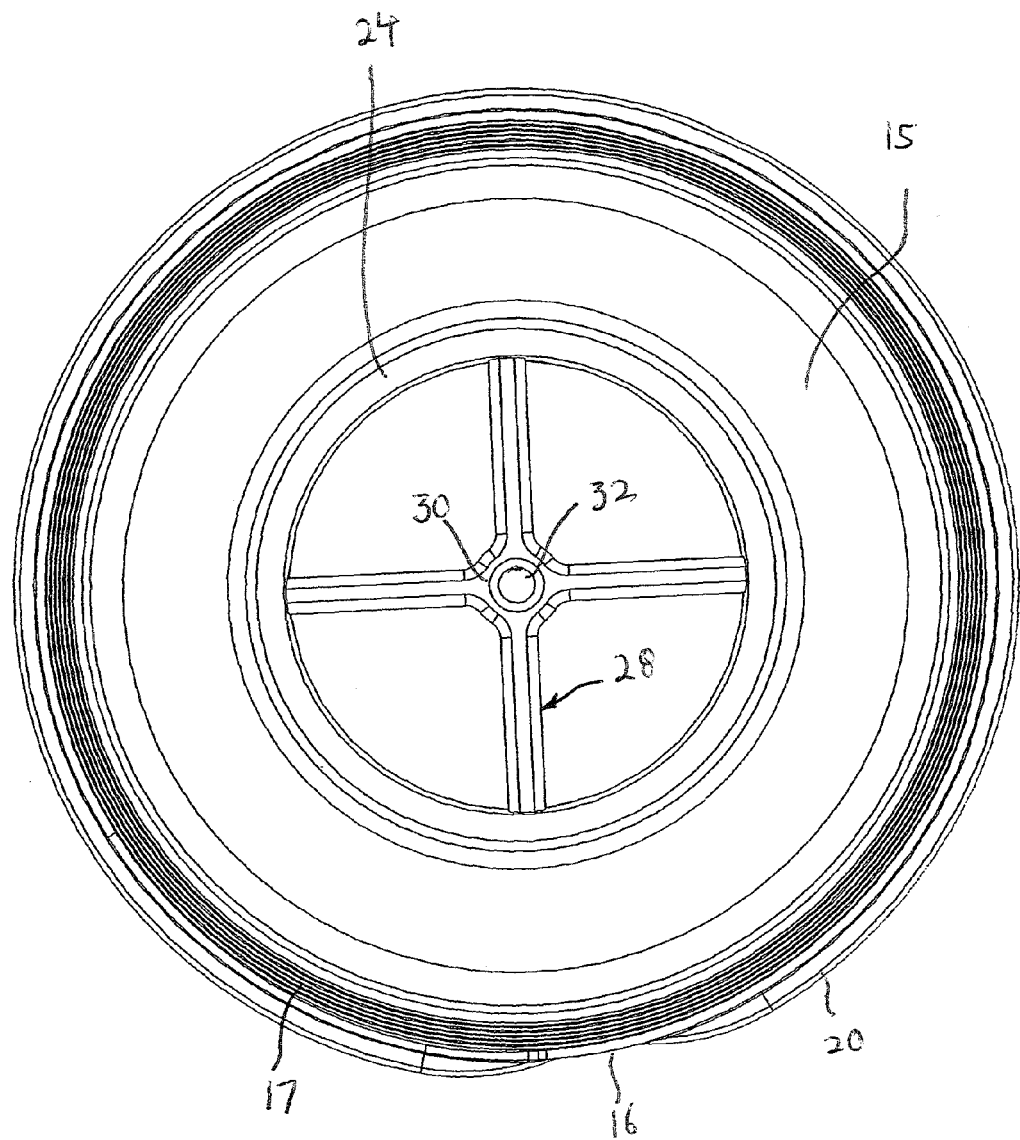
FIG. 10 is a top plan view of the cup body.
Figure 11:
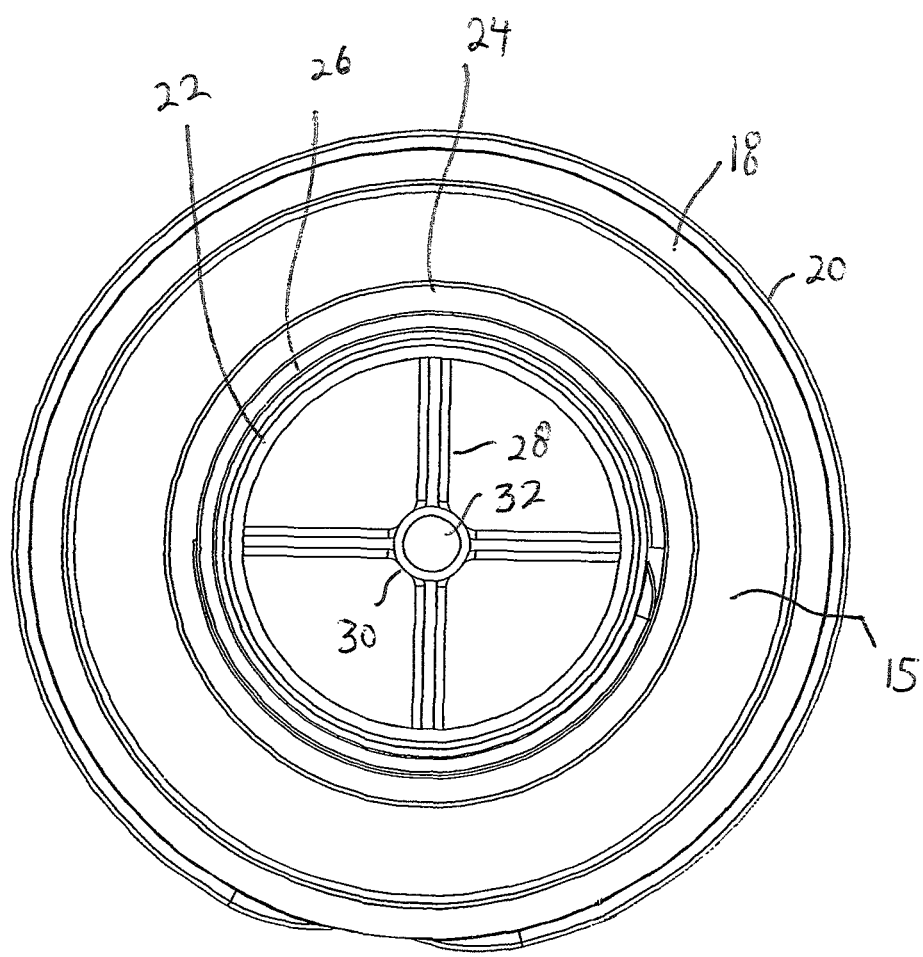
FIG. 11 is a bottom plan view of the cup body.
Figure 12:
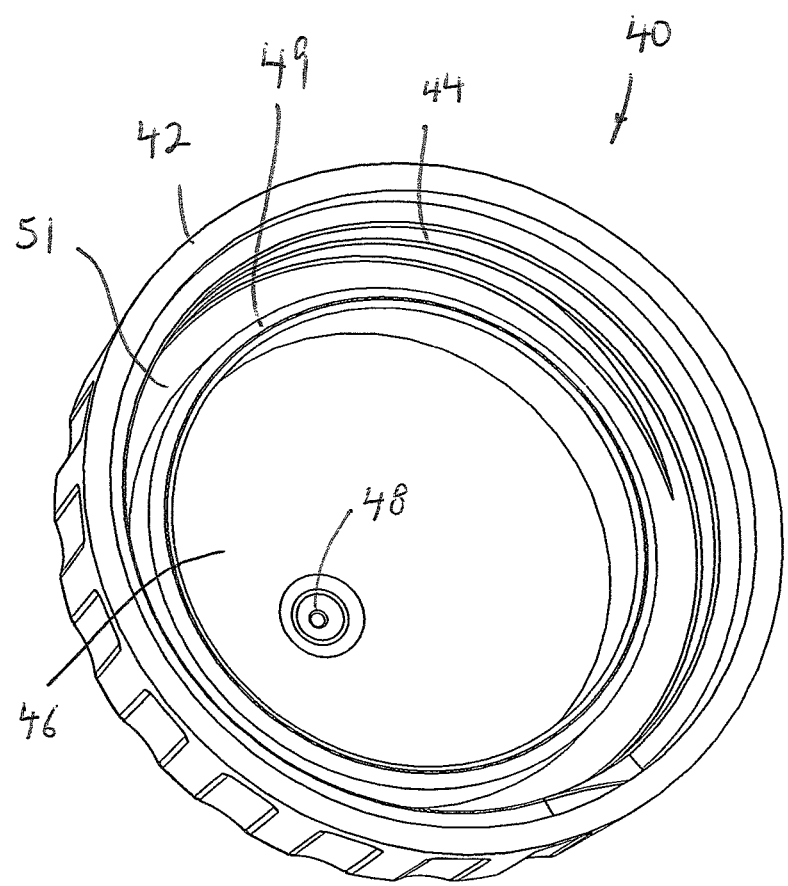
FIG. 12 is a top perspective view of the bottom cover of the brewable beverage making cup adaptor.
Figure 13:
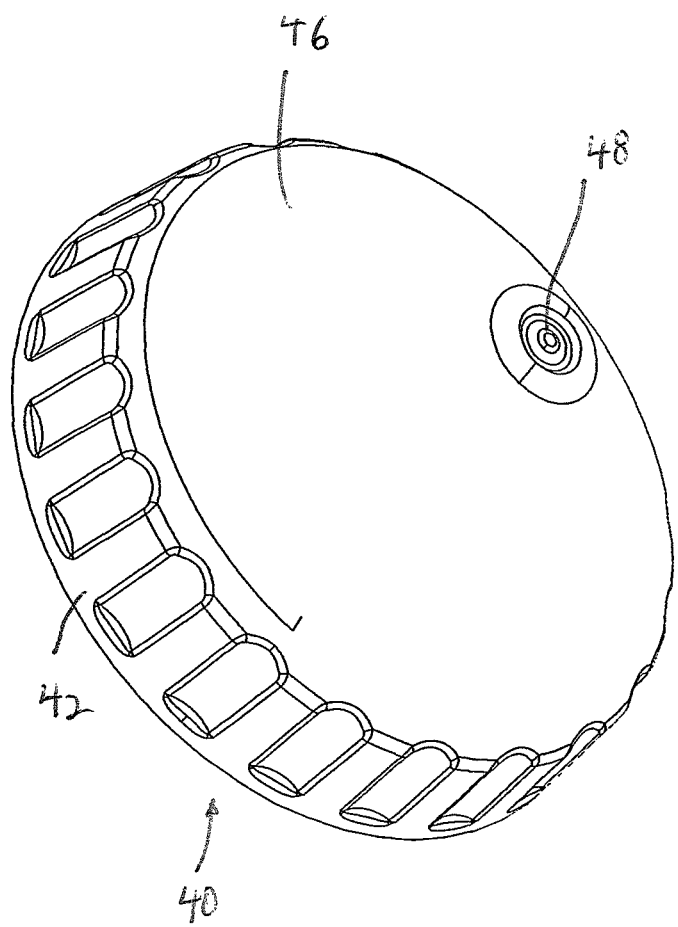
FIG. 13 is a bottom perspective view of the bottom cover.
Figure 14:
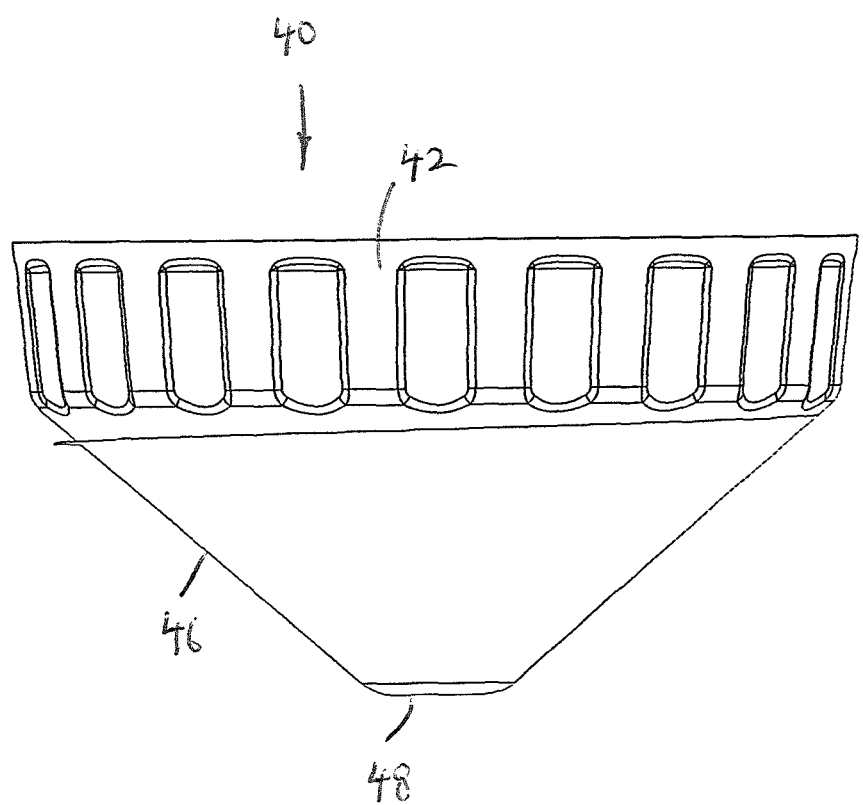
FIG. 14 is an elevational view of the bottom cover.
Figure 15:
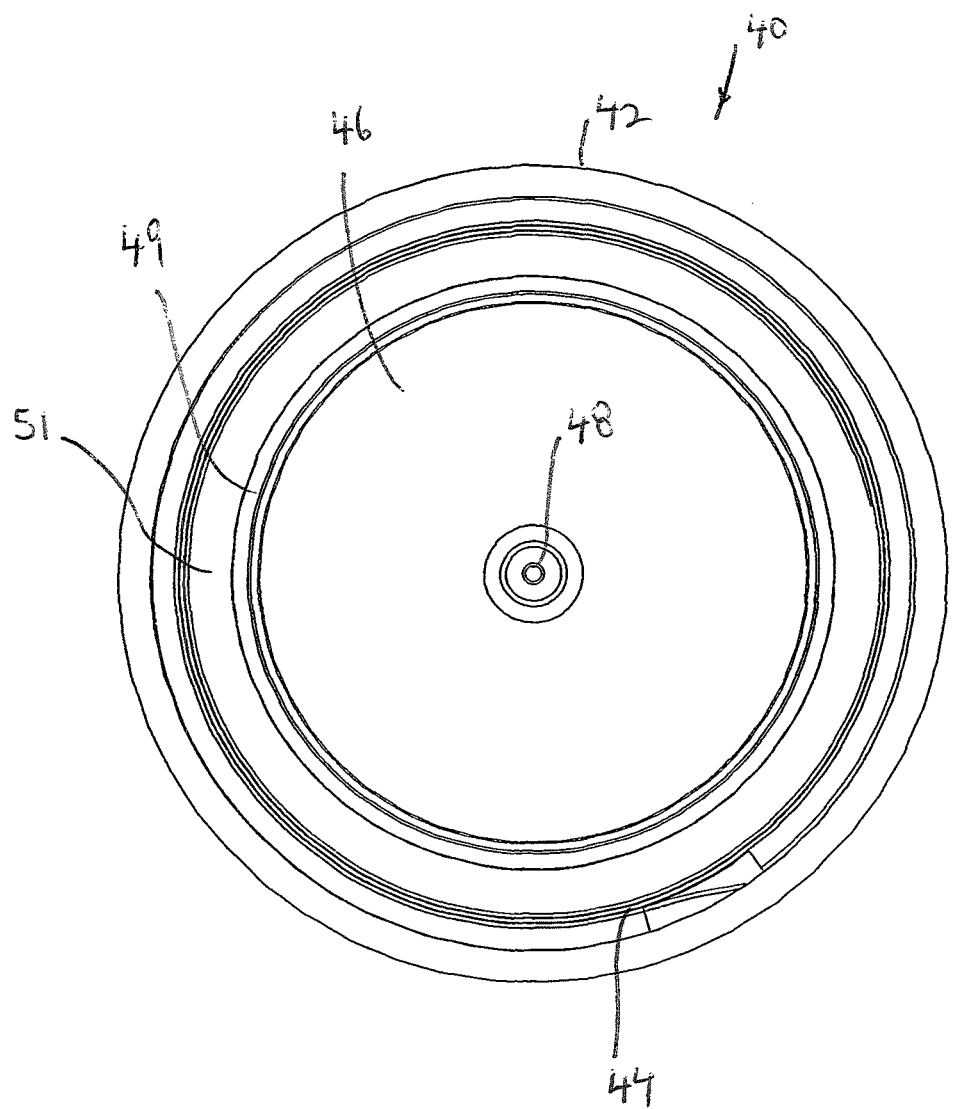
FIG. 15 is a top plan view of the bottom cover.
Figure 16:
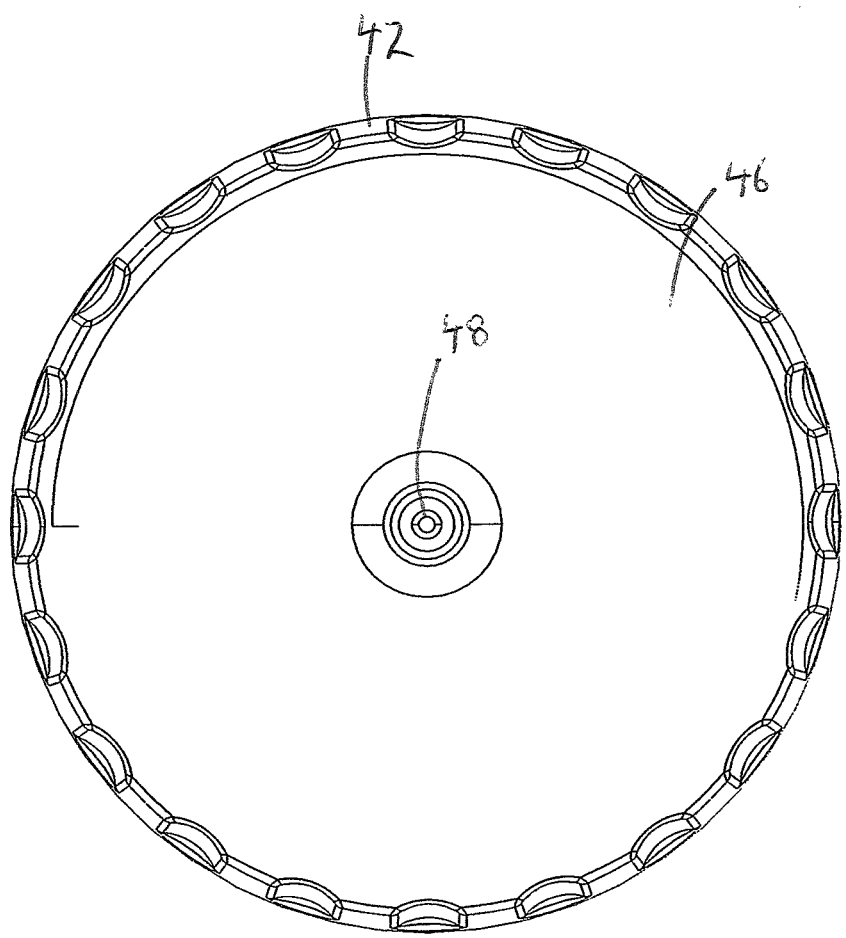
FIG. 16 is a bottom plan view of the bottom cover.
Figure 17:
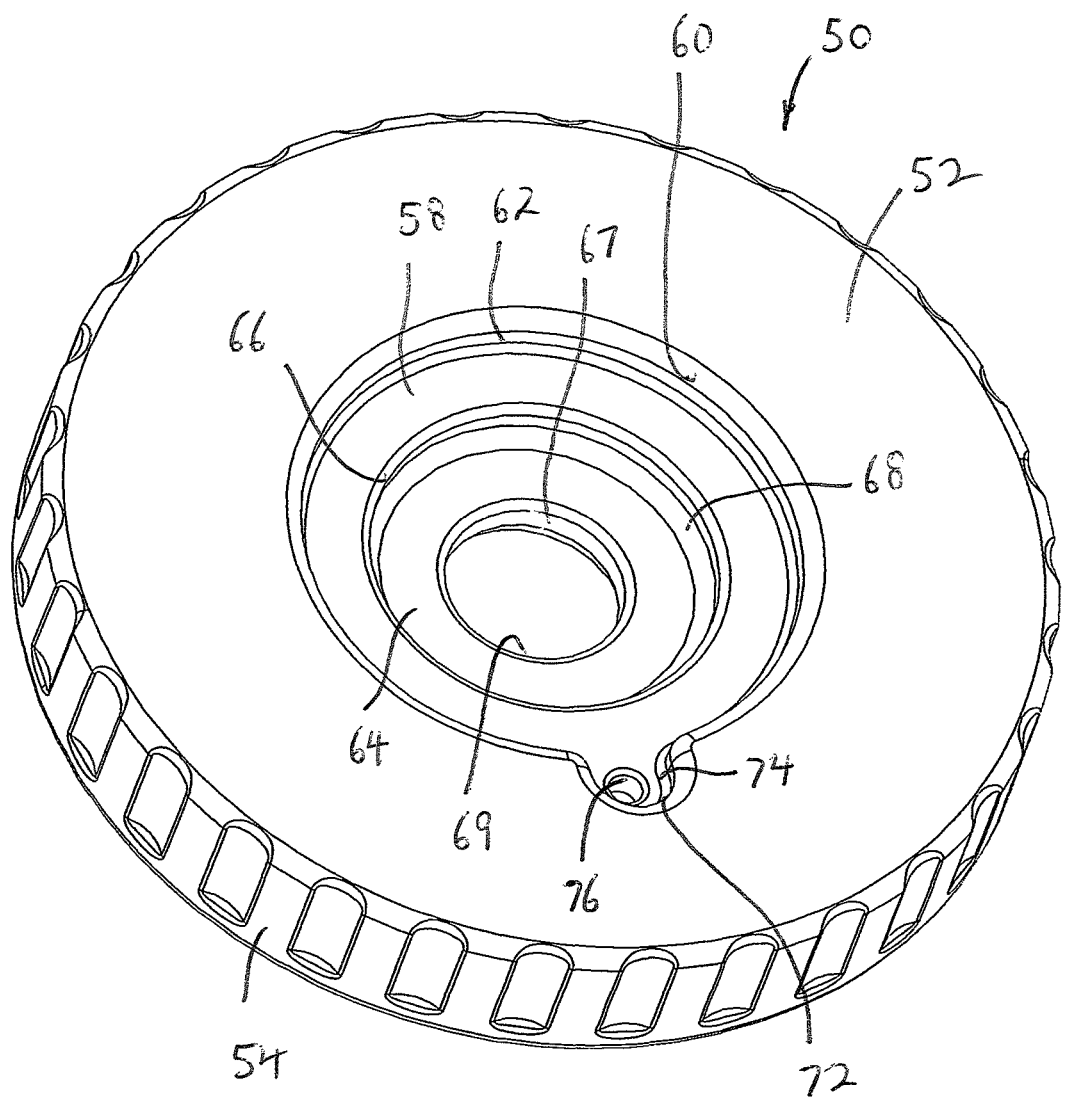
FIG. 17 is a top perspective view of the top cover of the brewable beverage making cup adaptor.

In addition, as shown in FIG. 5, slots 80 are preferably covered by a cup-shaped fine mesh screen 103 to prevent tea leaves and coffee grounds from entering valve housing 78, while still allowing the water to escape when the brewing cycle is completed. The lower end of mesh screen 103 would likewise cover the underside of float valve cover 84, and specifically, central opening 92 and offset openings 94 therein for the same purpose.

As shown in FIGS. 1, 5, 6 and 34-38, cover sealing member 104 fits within central inner opening 69 of second inner annular wall 64 of upper cover 50. Preferably, cover sealing member 104 is made from a silicone material. Specifically, cover sealing 104 includes an annular disk 106 with a central opening 108, and an annular recess 110 in the upper surface, starting from the inner circumference thereof at central opening 108. A downwardly extending annular wall 112 extends down from the lower surface of annular disk 106 in surrounding relation to central opening 108, and has a central opening 114 as a smooth continuation of central opening 108. A lower annular wall 116 of a greater diameter than annular wall 112 at the connection to annular wall 112, extends down from the lower surface of annular wall 112 in surrounding relation to central opening 114, and has a central opening 118 as a smooth continuation of central opening 114. Preferably, although not limited thereto, lower annular wall 116 has an inverted frusto-conical shape. Accordingly, an annular shoulder 120 is formed at the upper surface of lower annular wall 116 in surrounding relation to annular wall 112, and an annular recess 122 is defined by the lower surface of annular disk 106, the outer circumferential surface of annular wall 112 and annular shoulder 120.

In assembly, the lower surface of annular disk 106 seats on the upper surface of second inner annular wall 64, and the inner circumferential surface 67 of second inner annular wall 64 is captured in annular recess 122 between the lower surface of annular disk 106 and annular shoulder 120, so as to capture cover sealing 104 in this position.

Lastly, as shown in FIGS. 5, 6 and 39-44, a water entrance tube 124 is connected at its upper end to annular boss 70 of upper cover 50. Preferably, water entrance tube 124 is made from a glass material, a metal material or a plastic material such as polypropylene. Specifically, water entrance tube 124 includes an upper annular securing portion 126 which is cut-away at an upper, inner annular portion thereof to form an inner annular recess 128 defined by a lower annular surface 130 and an inner annular surface 132. Annular boss 70 tightly fits within inner recess 128 with the outer surface of annular boss 70 engaging with inner annular surface 132 and the depth of insertion of annular boss 70 limited by engagement of the lower surface of annular boss 70 with lower annular surface 130. In this manner, water entrance tube 124 is sealingly held to annular boss 70 and extends down into cup body 14.

Water entrance tube 124 tapers in diameter from upper annular securing portion 126 via a tapered neck portion 134 that terminates in an elongated lower annular tube portion 136, which in turn, terminates at its lower end, at a conical closure 138. Diametrically opposite discharge openings 140 are provided at the lower end of elongated lower annular tube portion 136, so that hot water under pressure entering upper annular securing portion 126, travels through opening 140 and exits water entrance tube 124 in a direction transverse to the central axis thereof. Preferably, discharge openings 140 are angled upwardly relative to the longitudinal direction or central axis of lower annular tube portion 136, for example, by 45 degrees. This forces the liquid and brewable substances to travel in a direction away from gravitational forces, and then to allow the gravitational forces to pull the liquid and brewable substances back down. It will further be appreciated that the combined opening areas of discharge openings 140 is much less than the opening area at the inlet of water entrance tube 124, so that the pressurized water is jetted out of discharge openings 140. As will be understood from the description hereafter, this arrangement of openings 140 causes agitation and turbulence of the water under pressure with the tea leaves in cup body 14.

With the above construction, brewable beverage making cup adaptor 10 may have, for, example, a two ounce capacity in container body 12 for holding hot water, although the present invention is not limited thereby. Tea leaves, or any other brewing substance, such as coffee grounds, cocoa, hops, malts and grains can also be used for such brewing. Brewable beverage making cup adaptor 10 is placed in a single serve coffee brewing machine, such as the one sold under the registered trademark KEURIG, instead of their single portion packets sold under the registered trademark K-CUP.

When the water is sufficiently hot and the start button is pressed, the input water spout 300 (FIG. 5) from the KEURIG machine is positioned above central opening 69, and water is supplied under pressure to water entrance tube 124. The pressurized water exits water entrance tube 124 through diametrically opposite discharge openings 140. Because of the small diameter of side openings 140, the hot water exiting therefrom is jetted out and causes agitation and turbulent action with the tea leaves. Because of the insertion of the input water spout and the pressurized water therefrom, air does not escape through central opening 69.

As the pressurized hot water agitates and causes turbulent motion of the tea leaves in container body 12, there is a steeping action. Container body 12 fills up with hot water because the amount of water entering container body 12 is greater than the amount of water leaving container body 12 through small discharge opening 48. In other words, discharge opening 48 is sized to allow only a small amount of brewed liquid therethrough at any given time, and the inlet to water entrance tube 124 is much greater in diameter than small discharge opening 48. In addition, there may be some blockage of small discharge opening 48 from the tea leaves themself, which aids in the different input/output rates of the water relative to the container body 12.

Initially, valve ball 102 sits on float valve cover 84 so that offset opening 76 is open to atmosphere. Therefore, as the water rises in container body 12, air in the upper end is pushed out through offset opening 76, thereby preventing an air or vapor lock in the upper portion of container body 12, which would otherwise limit the desired amount of water in container body 12. When the water rises to the level of the float valve housing 78, the buoyant valve ball 102 rises with the water, eventually abutting against silicone ball housing 77 and closing off offset opening 76.

During this time, pressurized hot water continues to enter container body 12. At the time when container body 12 is completely filled, the pressure is equal to the amount that the pump is pushing. Thus, at this time, the pressure in the container is elevated, which serves to better force the water into the tea leaves to better extract the flavor from the tea leaves in a shorter amount of time. Further, at this time, when the container body 12 is pressurized and completely full, an amount of steeped hot tea continues to exit container body 12 through small discharge opening 48 at the same rate that fresh water enters the container body 12. This will continue until the desired amount of tea is brewed, and this can be, for example, 8 ounces for a single glass or 32 ounces for a pitcher or pot.

When the input pressurized hot water through water entrance tube 124 is stopped, the steeped tea continues to exit container body 12 through small discharge opening 48. When the water in container body 12 falls below the level of valve ball 102, valve ball 102 floats back down and seats on float valve cover 84, whereby offset opening 76 is opened to atmospheric pressure, which aids in pushing the remainder of the steeped tea, along with gravitational forces, out through small discharge opening 48.

It will therefore be appreciated that the use of the float valve assembly comprised of offset opening 76, silicone ball housing 77, float valve housing 78, float valve cover 84 and valve ball 102, permits air to escape to prevent air or vapor lock as the container body 12 is filling, closes offset opening 76 when container body 12 is full, and opens offset opening 76 as the level of water in container body 12 falls. The advantage is that this creates a pressurized container which forces the water into the tea leaves to extract the flavor therefrom in a very short period of time. It is noted that this is because of the pressurized environment of container body 12, which is very different from merely supplying water under pressure into a container or cup, as with the present KEURIG or NESPRESSO machine.

It will be appreciated that, although a float valve has been described, the present invention is not limited thereby, and any other suitable valve can be used.

Brewable beverage making cup adaptor 10 can be made as a one time throw away container, or as a refillable container, that the user can wash out and refill with new tea leaves or other brewable substances.

Figure 3:
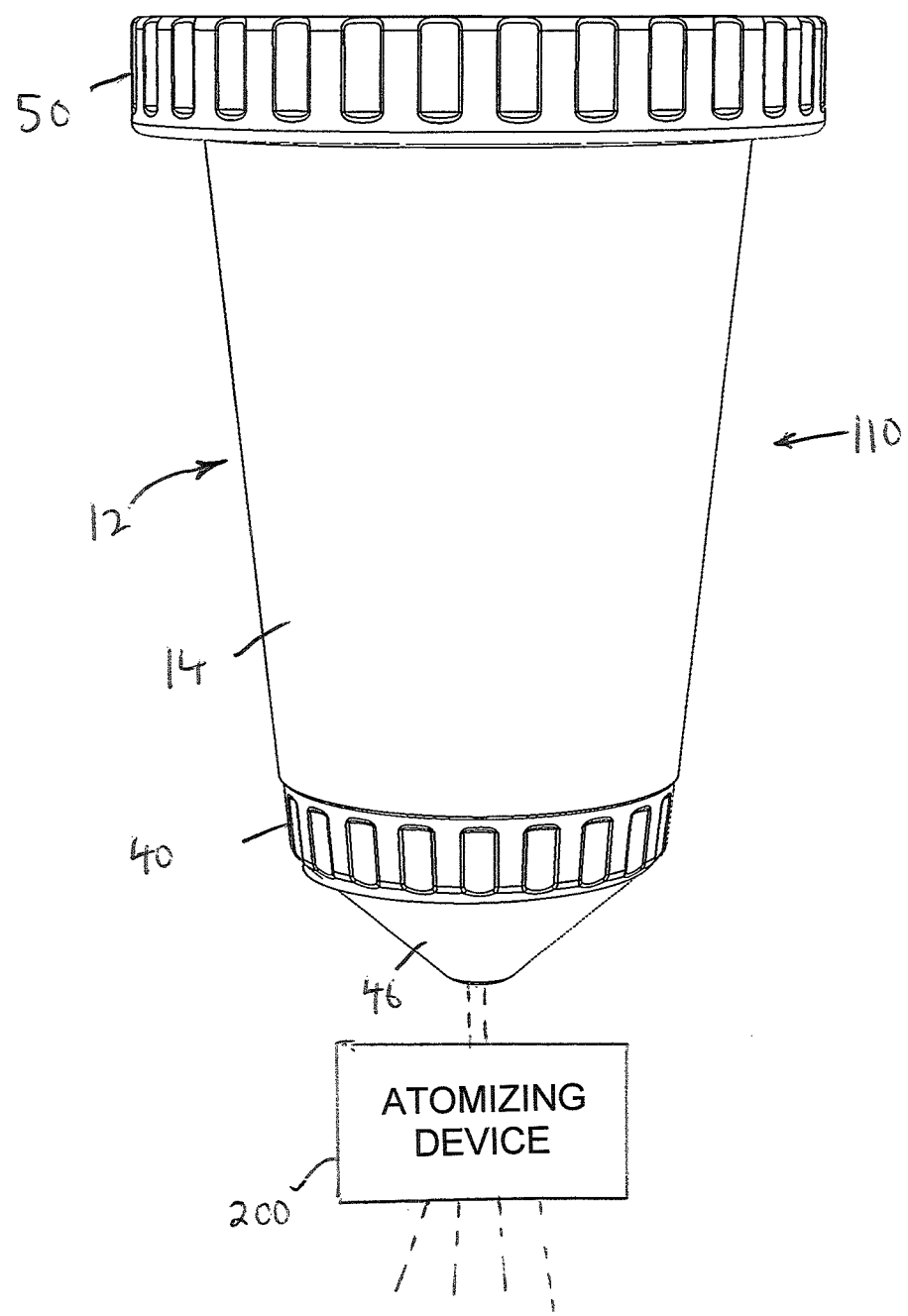
FIG. 3 is an elevational view of the brewable beverage making cup adaptor, with an atomizing device.
Figure 4:
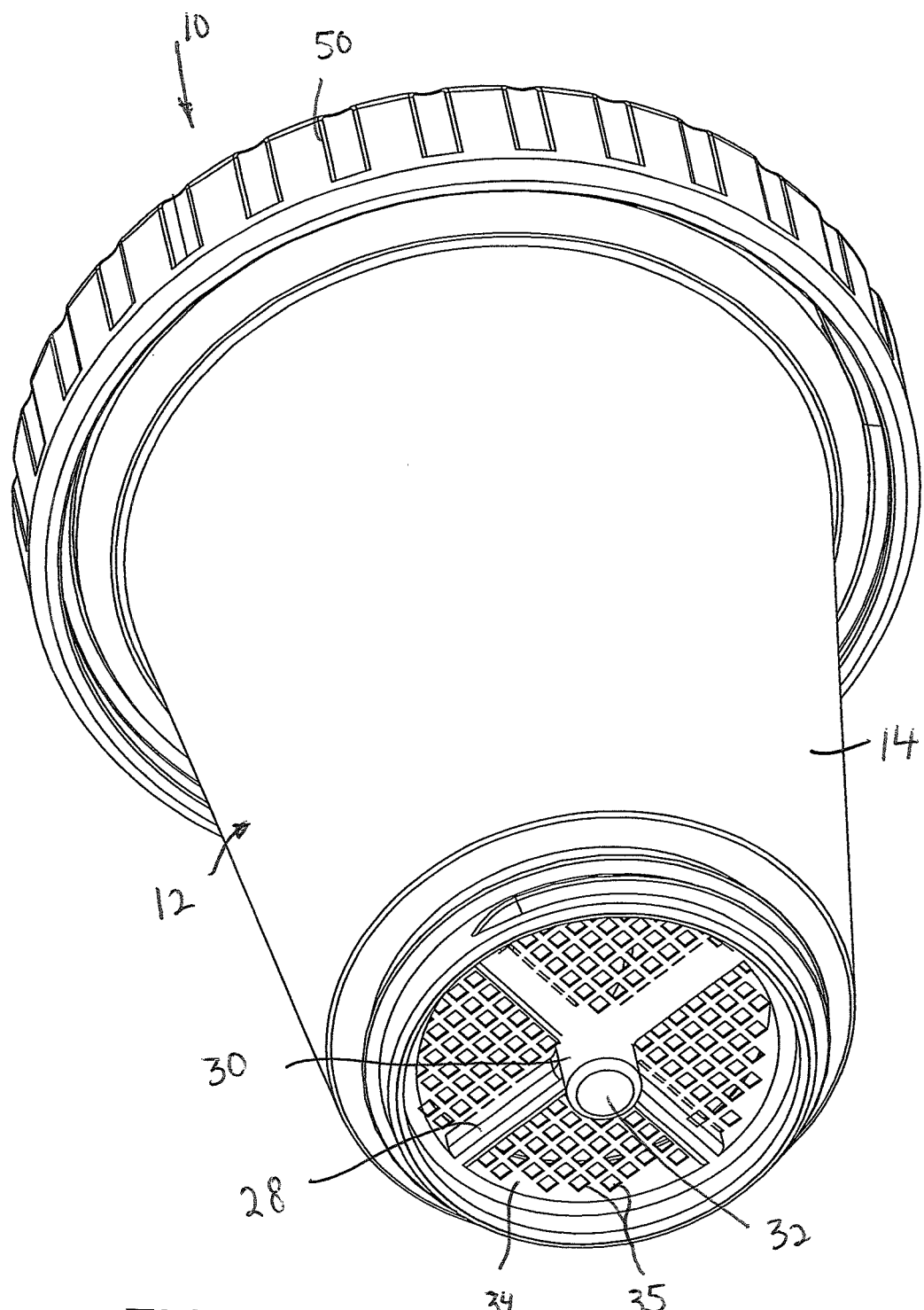
FIG. 4 is a bottom perspective view of the brewable beverage making cup adaptor, with the bottom cover removed.

As a secondary feature, an atomizing device 200 can be provided at the lower end of container body 12 or bottom cover 40, or even immediately below opening 48, as shown in FIG. 3, so that, as the tea exits small discharge opening 48, atomizing device 200 functions to break up the liquid tea into small mist-like droplets. As a result, the hot tea will cool quicker and can then be supplied to a glass having ice therein. This is because there is a larger surface area of the tea from the droplets that is exposed to the ambient atmosphere, which acts to cool down the tea quicker. Because the tea is cooled somewhat before hitting the ice, the tea will not completely melt the ice in the glass.

Atomizing device 200 can be any conventional atomizing device. For example, atomizing device 200 can simply be formed by a screen (not shown) with extremely small openings through which the liquid must travel, and which causes the liquid to disperse in a fine spray. Alternatively, for example, atomizing device 200 can use the known venturi effect. In this case, as a gas is injected under pressure through a tube with a decreasing section or venturi, it speeds up, generating a pressure drop at the narrowest point, due to Bernoulli's principle. The reduced pressure, due to the pressure difference between the two points, sucks up the liquid from container body 12 or exiting container body 12, through a narrow tube into the moving gas flow, and projects it forward as a fine spray of droplets, similar to a traditional type of atomizer used for perfume.

Figure 45:
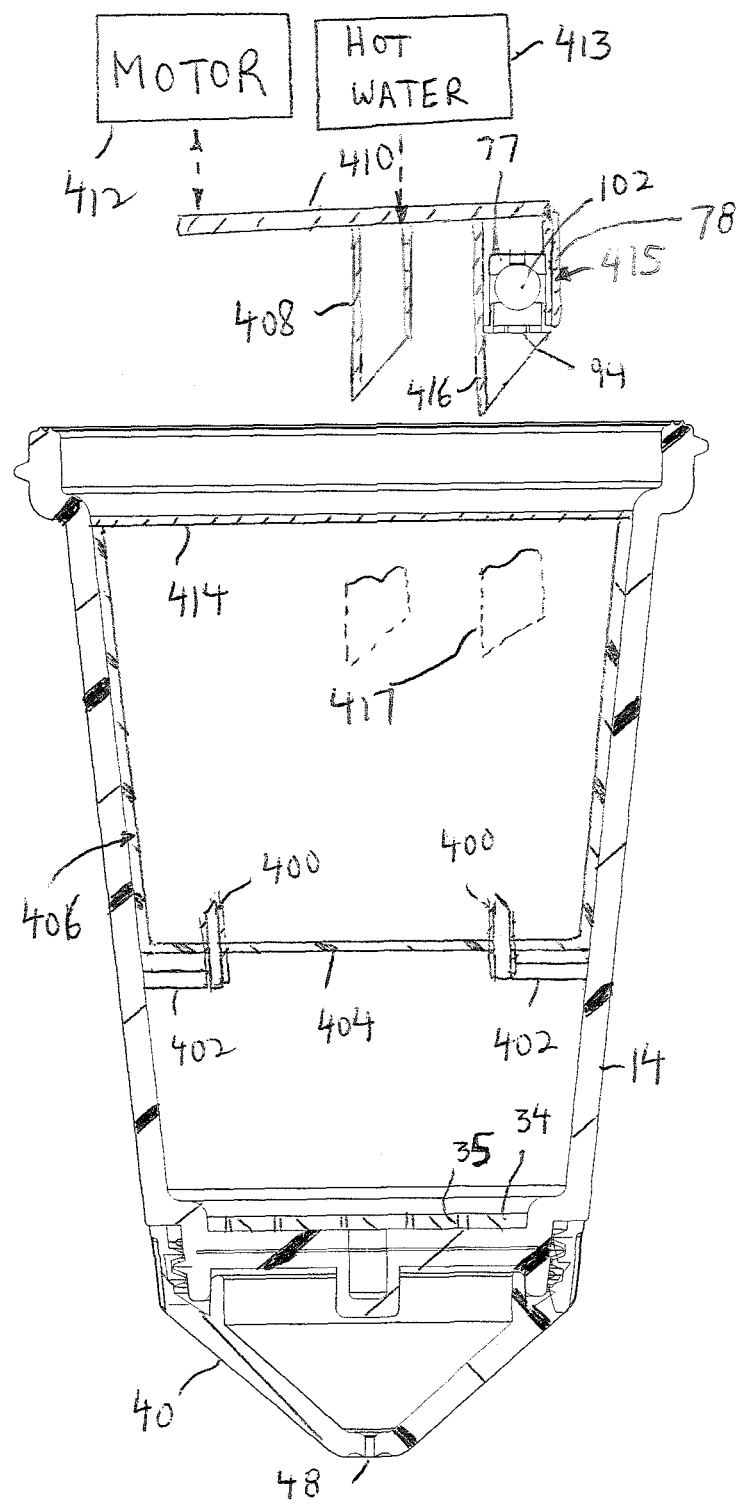
FIG. 45 is a cross-sectional view of a cartridge type coffee making machine according to another embodiment of the present invention.

It will be appreciated that various modifications can be made to the present invention within the scope of the claims. For example, upper cover 50, annular sealing ring 57, cover sealing member 104 and water entrance tube 124, can be eliminated. In such case, a KEURIG K-CUP packet 406 can be placed in main body 14 as far down is it will travel, as shown in FIG. 45. At least one hollow piercing tube 400 extends from main body 14 by extensions 402 and pierces the bottom wall 404 of the K-CUP packet 406. As with a conventional KEURIG machine, an inlet piercing tube 408 connected with a supply 413 of pressurized hot water is mounted on an arm 410 which can be moved up and down by a motor 412 so that inlet piercing tube 408 pierces foil lid 414 of the K-CUP packet 406 to supply pressurized hot water thereto. However, in such case, to conform to the present invention, a float valve assembly 415 of the same construction as the first embodiment, instead of being mounted on an upper cover, is mounted to movable arm 410 and has a piercing tube 416 at the lower end thereof for also piercing foil lid 414. In such case, the float valve assembly 415 which can be of identical construction to the float valve assembly of the first embodiment, is positioned inside of the K-CUP packet 406 after piercing tube 416 pierces foil lid 414, as shown by the dashed lines 418 in FIG. 45.

This arrangement therefore operates in the same manner as the first embodiment, while being able to use a conventional K-CUP packet. It will be appreciated that the above arrangement is intended to be used with the sub-housing of the conventional KEURIG machine removed, as with their refillable basket.

Still further, the arrangement of the float valve assembly 415 on arm 410, as shown in FIG. 45 can be used merely with a conventional KEURIG machine with their K-CUP, in which the sub-housing is assembled therewith.

Still further, upper cover 50 of the first embodiment can be modified to remove the float valve assembly therefrom, and place it on arm 410 as shown in FIG. 45. In such case, upper cover 50 would have a larger offset opening, shown by dashed lines 417 in FIG. 1, through which float valve assembly 415 on arm 410 can extend, with the dimensions of float valve assembly 415 being such that it seals the periphery of the larger offset opening 418 in upper cover 50, so that air can only escape through float valve assembly 415.

It will be appreciated that it is important that the air at the upper portion of the brewable beverage making cup adaptor be evacuated therefrom during initial filling of the hot water therein, whereby the adaptor or packet becomes pressurized once it is filled with hot water and the air escapes therefrom. This prevents air or vapor lock at the upper end of the adaptor or packet during filling of the hot water therein.

Figure 46:
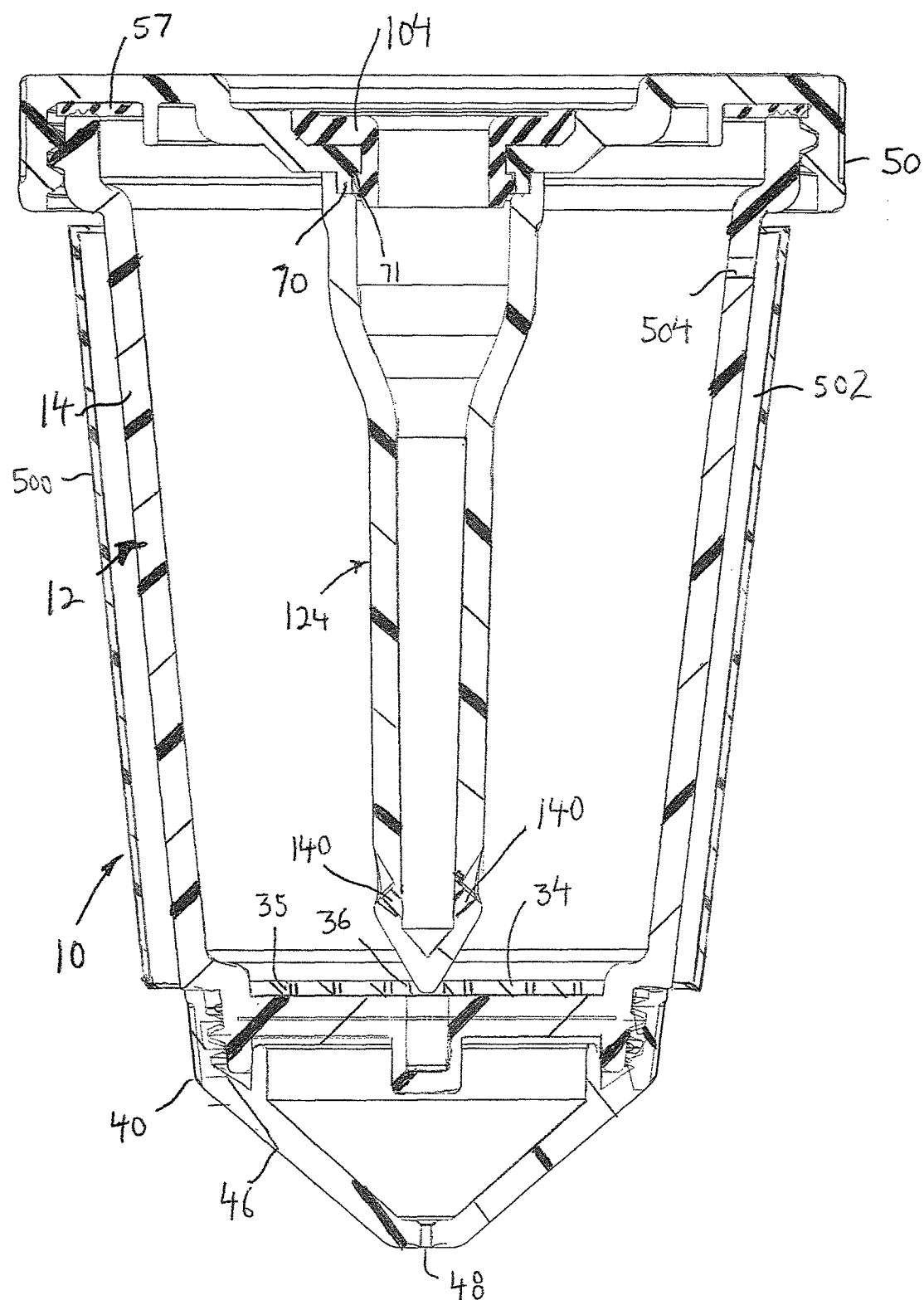
FIG. 46 is a cross-sectional view of a cartridge type coffee making machine according to still another embodiment of the present invention.

In order to accomplish this in the first embodiment, a float valve was provided at the upper portion thereof. However, the same effect can be achieved without the use of a valve, as shown in the embodiment of FIG. 46. Specifically, a thin closed annular wall 500 can be provided in surrounding relation to cup body 12 so as to provide an enclosed thin annular air chamber 502 between wall 500 and cup body 12 that is not open to atmosphere. A small opening 504 is provided in the upper wall of cup body 12 so as to provide fluid communication between the inner space of cup body 12 and air chamber 502.

As a result of this structure, as cup body 12 is filled with hot water, the air inside cup body is forced up and out through opening 504 into air chamber 502. The dimensional area of air chamber 502 is selected so that when the water reaches the level of opening 504, the air in air chamber 502 is compressed to such an extent as to provide an equalized pressure, whereby the compressed air in air chamber 502 prevents the water from entering opening 504. As a result, the water can fill cup body 12 whereby, as with the first embodiment, the pressure in the container is elevated, which serves to better force the water into the tea leaves to better extract the flavor from the tea leaves in a shorter amount of time. Further, at this time, when the container body 12 is pressurized and completely full, an amount of steeped hot tea continues to exit container body 12 through small discharge opening 48 at the same rate that fresh water enters the container body 12. This will continue until the desired amount of tea is brewed, and this can be, for example, 8 ounces for a single glass or 32 ounces for a pitcher or pot.

When the input pressurized hot water through water entrance tube 124 is stopped, the steeped tea continues to exit container body 12 through small discharge opening 48. When the water in container body 12 starts to fall, the compressed air re-enters cup body through opening 504 because the pressure in air chamber 502 is then greater than the pressure within cup body 12, and this serves to further aid in pushing the remainder of the steeped tea, along with gravitational forces, out through small discharge opening 48.

It will therefore be appreciated that the use of air chamber 502 permits air to escape into air chamber 502 to prevent air or vapor lock as the container body 12 is filling. As with the first embodiment, the advantage is that this creates a pressurized container which forces the water into the tea leaves to extract the flavor therefrom in a very short period of time.

It will also be appreciated that any area in cup body 12 above opening 504, in which air is present, will have no appreciable affect on the operation described above.

Of course, it will be appreciated that air chamber 502 can be provided at different positions, for example, at the inner surface of cup body 12, as part of and below the lower surface of annular upper disk 52, as part of and above the upper surface of annular upper disk 52, or any other suitable location.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. A brewable beverage making cup adaptor for cartridge type coffee making machines of the type having an inlet spout for supplying a pressurized hot liquid, comprising:
   a cup body defining a chamber for holding a brewable material, said cup body having:
      a discharge opening at a lower end thereof through which a brewed liquid is discharged,
      an inlet opening adapted to be positioned relative to the inlet spout for the supply of pressurized liquid to said cup body, and
      a third opening for providing for removal of air from an upper portion of said chamber as the pressurized hot liquid fills said chamber; and an arrangement fluidly connected with said chamber for preventing liquid in the chamber from exiting through said third opening only when said chamber is at least almost completely filled with the pressurized liquid and which provides for increased pressurization of the chamber when the pressurized hot liquid fills said chamber and said air is removed from said upper portion of said chamber.

2. A brewable beverage making cup adaptor according to claim 1 wherein said arrangement also permits air to enter the chamber when a level of said pressurized hot liquid in said chamber falls at the end of a brewing operation.

3. A brewable beverage making cup adaptor according to claim 1, wherein said arrangement includes a closed air chamber in fluid communication with the third opening of the chamber in the cup body into which the air is removed from the upper portion of said chamber as the pressurized hot liquid fills said chamber, and which becomes compressed in said closed air chamber.

4. A brewable beverage making cup adaptor according to claim 1:
   further comprising an upper cover for closing an upper end of said cup body, said upper cover including said third opening for fluidly connecting said chamber with ambient atmosphere, and
   wherein said arrangement includes a valve associated with said third opening for closing said third opening when said chamber is filled at least at a predetermined level with the pressurized liquid and for opening said third opening when the pressurized liquid in the chamber falls below said predetermined level.

5. A brewable beverage making cup adaptor according to claim 1, further including:
   an upper cover for closing an upper end of said cup body, said upper cover including said third opening for fluidly connecting said chamber with ambient atmosphere and the inlet opening, and
   an elongated liquid entrance tube connected with said upper cover and extending down therefrom into said chamber, said liquid entrance tube having:
     an inlet opening fluidly connected with said inlet opening of said upper cover and extending into said chamber, and
     at least one outlet opening in said liquid entrance tube.

6. A brewable beverage making cup adaptor according to claim 1, wherein said discharge opening has a smaller diameter than the inlet opening.

7. A brewable beverage making cup adaptor according to claim 1, further including a filter member at a lower end of said cup body and above said discharge opening to prevent escape of the brewable material through said discharge opening.

8. A brewable beverage making cup adaptor according to claim 1, wherein said lower end of the cup body includes a tapered wall structure for guiding a brewed liquid from said cup body to said discharge opening.

9. A brewable beverage making cup adaptor according to claim 1, further including an atomizing device positioned below said discharge opening for atomizing a brewed liquid from said cup body discharged through said discharge opening in order to cool the brewed liquid.

10. A brewable beverage making cup adaptor according to claim 3, wherein said closed air chamber is defined by an annular closed wall in surrounding relation to said cup body.

11. A brewable beverage making cup adaptor according to claim 4, wherein said valve is connected to said upper cover.

12. A brewable beverage making cup adaptor according to claim 4, wherein said valve includes a valve housing, and further including a screen at least partially covering said valve housing to prevent tea leaves and coffee grounds from entering the valve housing, while still allowing liquid to escape the valve housing when a brewing cycle is completed.

13. A brewable beverage making cup adaptor according to claim 4, wherein said valve is a float valve including a valve housing positioned at said third opening, a valve ball movably positioned within said valve housing and a retaining assembly for retaining said valve ball in said valve housing while permitting liquid to travel into and out of said valve housing, wherein said valve ball rises with said pressurized liquid when said pressurized liquid reaches said predetermined level to close said third opening, and falls when said pressurized liquid falls below said predetermined level to open said third opening.

14. A brewable beverage making cup adaptor according to claim 5, wherein said at least one outlet opening includes two diametrically opposite outlet openings.

15. A brewable beverage making cup adaptor according to claim 5, wherein each outlet opening is angled upwardly.

16. A brewable beverage making cup adaptor for cartridge type coffee making machines of the type having an inlet spout for supplying pressurized hot liquid, comprising:
   a cup body defining a chamber for holding a brewable material, said cup body having a discharge opening at a lower end thereof through which a brewed liquid is discharged, and an inlet opening adapted to be positioned relative to said inlet spout for the supply of pressurized liquid to said cup body, and
   an atomizing device positioned below said discharge opening for breaking up a brewed liquid from said cup body discharged through said discharge opening into smaller particles in order to cool the brewed liquid.

17. A cartridge type coffee making machine for use with a single serve cartridge containing a brewable material, said machine comprising:
   a source of pressurized hot liquid,
   a movable support,
   an inlet spout connected with the movable support and the source of pressurized hot liquid and defining a first opening for supplying pressurized hot liquid through an inlet supply opening in the single serve cartridge to a chamber in the single serve cartridge that contains a brewable material,
   a valve assembly connected with said movable support and defining a second opening for preventing liquid in the chamber from exiting through said second opening only when said chamber is at least almost completely filled with the pressurized liquid and which provides for increased pressurization of the chamber when the pressurized hot liquid fills said chamber and said air is removed from said upper portion of said chamber, said valve assembly closing a valve opening in the single serve cartridge when said chamber is filled at least at a predetermined level with the pressurized liquid and for opening said valve opening when the pressurized liquid in the chamber falls below said predetermined level, and
   an arrangement for moving said movable support between a first operative position where the inlet spout is adapted to supply the pressurized hot liquid to the chamber through the inlet supply opening and the valve assembly is moved into said chamber through said valve opening, and a second inoperative position where the inlet spout is moved away from the inlet supply opening and the valve assembly is moved out of said chamber, and a discharge opening for discharging a brewed liquid from said chamber.

18. A cartridge type coffee making machine according to claim 17, wherein said single serve cartridge includes a top having said inlet supply opening and said valve opening.

19. A cartridge type coffee making machine according to claim 17, wherein:

said single serve cartridge includes a piercable top, said inlet spout includes a first piercing end that pierces said piercable top to create said inlet supply opening when said movable support is moved to said first operative position, and said valve assembly includes a second piercing end that pierces said piercable top to create said valve opening when said movable support is moved to said first operative position.

20. A cartridge type coffee making machine according to claim 17, further comprising at least one discharge piercing tube that pierces a bottom of said cartridge when said cartridge is positioned in said machine to create an outlet opening in said cartridge, to permit the brewed liquid to exit through said discharge opening.

21. A cartridge type coffee making machine according to claim 17, further comprising a container for holding one said cartridge, said container including at least one discharge piercing tube that pierces a bottom of said cartridge when said cartridge is positioned in said container to create an outlet opening in said cartridge, to permit the brewed liquid to exit through said discharge opening.

* * * * *